United States Patent
Chen et al.

(10) Patent No.: US 11,272,417 B2
(45) Date of Patent: Mar. 8, 2022

(54) CONDITIONAL HANDOVER PROCEDURES

(71) Applicant: FG Innovation Company Limited, Tuen Mun (CN)

(72) Inventors: Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/246,056

(22) Filed: Jan. 11, 2019

(65) Prior Publication Data
US 2019/0223073 A1  Jul. 18, 2019

Related U.S. Application Data

(60) Provisional application No. 62/616,785, filed on Jan. 12, 2018.

(51) Int. Cl.
*H04W 36/00* (2009.01)
*H04W 76/18* (2018.01)
(Continued)

(52) U.S. Cl.
CPC ..... *H04W 36/305* (2018.08); *H04W 36/0058* (2018.08); *H04W 36/0077* (2013.01);
(Continued)

(58) Field of Classification Search
CPC ......... H04W 36/0058; H04W 36/0077; H04W 36/0079; H04W 36/00837; H04W 36/08;
(Continued)

(56) References Cited

U.S. PATENT DOCUMENTS

2014/0126545 A1* 5/2014 Tamura ............. H04W 36/0079
370/332
2014/0133465 A1  5/2014 Johansson et al.
(Continued)

FOREIGN PATENT DOCUMENTS

CN  107079369 A  8/2017
CN  107113673 A  8/2017
(Continued)

OTHER PUBLICATIONS

Interdigital Communications Conditional Reconfiguration for NR 3GPP TSG-RAN WG2 Meeting #99bis R2-1710669 Oct. 13, 2017(Oct. 13, 2017) pp. 2-3.
(Continued)

*Primary Examiner* — Noel R Beharry
*Assistant Examiner* — M Mostazir Rahman
(74) *Attorney, Agent, or Firm* — ScienBiziP, P.C.

(57) ABSTRACT

A method for a conditional handover (CHO) is described in some of the present embodiments. The method may receive from a source base station (e.g., a gNB or an eNB) one or more CHO commands that each is associated with one or more triggering conditions for a CHO to a target cell associated with a target base station (e.g., a target gNB or a target eNB). The method may continuously evaluate the triggering condition(s) associated with each received (and valid) CHO command. When the method determines that at least one of the triggering conditions has been fulfilled, the method may execute the CHO command that is associated with the triggering condition in order to connect to one or more candidate target cells associated with the CHO command.

12 Claims, 21 Drawing Sheets

(51) Int. Cl.
*H04W 36/30* (2009.01)
*H04W 76/19* (2018.01)
*H04W 76/27* (2018.01)
*H04W 36/08* (2009.01)
*H04W 74/00* (2009.01)

(52) U.S. Cl.
CPC . *H04W 36/0079* (2018.08); *H04W 36/00837* (2018.08); *H04W 36/08* (2013.01); *H04W 74/008* (2013.01); *H04W 76/18* (2018.02); *H04W 76/19* (2018.02); *H04W 76/27* (2018.02)

(58) Field of Classification Search
CPC . H04W 36/305; H04W 74/008; H04W 76/18; H04W 76/19; H04W 76/27
See application file for complete search history.

(56) References Cited

U.S. PATENT DOCUMENTS

| | | | |
|---|---|---|---|
| 2016/0150455 | A1 | 5/2016 | Suryavanshi |
| 2017/0086107 | A1 | 3/2017 | Hu et al. |
| 2019/0281511 | A1* | 9/2019 | Susitaival ......... H04W 36/0061 |
| 2020/0022042 | A1* | 1/2020 | Yin ................ H04W 36/00837 |
| 2020/0077314 | A1* | 3/2020 | Hwang ............... H04W 36/36 |
| 2020/0229043 | A1* | 7/2020 | Yao ..................... H04W 36/08 |
| 2020/0281038 | A1* | 9/2020 | Fujishiro ............ H04W 36/305 |

FOREIGN PATENT DOCUMENTS

| | | |
|---|---|---|
| CN | 107431966 A | 12/2017 |
| EP | 3029996 A | 6/2016 |
| JP | 2017-525306 A | 8/2017 |
| KR | 10-2010-0087821 A | 8/2010 |
| WO | 2014/134831 A1 | 9/2014 |

OTHER PUBLICATIONS

Astri et al., "Discussion on Conditional Handover in NR", R2-1713747, 3GPP TSG-RAN WG2 Meeting #100, Reno, USA, Nov. 27-Dec. 1, 2017.

ZTE Corporation et al., "Discussion on single connected handover", R2-1800438, 3GPP TSG-RAN WG2 NR Ad hoc 0118, Vancouver, Canada, Jan. 22-Jan. 26, 2018.

Samsung, "Introduction of Conditional handover", R2-1713856, 3GPP TSG-RAN WG2 #100, Reno, Nevada, Nov. 27- Dec. 1, 2017.

Ericsson, "On Reliability, overhead and controllability aspects of Conditional Handover", R2-1713608, 3GPP TSG-RAN WG2 #100, Reno, US, Nov. 27-Dec. 1, 2017.

Ericsson, "Conditional Handover", R2-1713606, 3GPP TSG-RAN WG2 #100, Reno, Nevada, Nov. 27-Dec. 1, 2017.

ASTRI, TCL Communication Ltd., "Discussion on Conditional Handover in NR", R2-1800663, 3GPP TSG-RAN WG2 NR Ad hoc 1801, Vancouver, Canada, Jan. 22-Jan. 26, 2018.

* cited by examiner

CONDITIONAL HANDOVER PROCEDURES

CROSS-REFERENCE TO RELATED APPLICATION(S)

The present application claims the benefit of and priority to a provisional U.S. Patent Application Ser. No. 62/616,785 filed on Jan. 12, 2018, entitled "Conditional Handover Procedure,". The disclosure of the U.S. application 62/616,785 is hereby incorporated fully by reference into the present application.

FIELD

The present disclosure generally relates to wireless communications, and more particularly, to conditional handover procedures.

BACKGROUND

In a wireless communication network, such as an evolved-universal terrestrial radio access network (E-UTRAN), one of the main causes of handover failure is a user equipment (UE) not receiving a Handover Command message from a source base station (e.g., a source evolved NodeB (eNB) or a source next generation NodeB (gNB)) or a serving base station (e.g., a serving eNB or a serving gNB). A conventional handover procedure is usually triggered by a measurement report from the UE. For example, when the serving cell's quality (e.g., signal strength and/or service quality) is below a preconfigured threshold and a neighboring cell's quality (e.g., signal strength and/or service quality) is above a preconfigured threshold, the UE may send a measurement report to the source base station under the serving cell based on the received measurement configurations. Upon receiving the measurement report, the source base station may send a Handover Request message to multiple target base stations (e.g., eNB or gNB) for admission control, and receive Handover Acknowledgement messages from the target base stations. The source base station may select and send a Handover Command message in a Handover Acknowledgement message from one of the target base stations to the UE so that the UE can connect to the target cell.

The success of the overall handover procedure depends on several factors. One of the factors is that the serving cell quality does not drop rapidly within a short period of time, which may be dominated by the latency of the backhaul (e.g., for X2/Xn/Xx interface), the target base stations processing time, and the signaling transmission time. Unfortunately, in a real world situation, the serving cell quality can drop very quickly within a short period of time, and the UE may not have sufficient time to successfully receive the Handover Command message before the serving cell quality drops significantly. As a result, the UE may detect a radio link failure. Consequently, in response to detecting the radio link failure, the UE may initiate a radio resource control (RRC) Connection Re-establishment procedure, which in turn leads to a considerable amount of service interruption time. In a next generation wireless network (e.g., a $5^{th}$ generation (5G) new radio (NR) network), with massive antenna beamforming in higher frequency bands, a serving cell quality may degrade even faster, especially when narrow beams are used to serve the UE. Blockage is another unavoidable problem in NR deployments.

The $3^{rd}$ Generation Partnership Project (3GPP) has introduced the concept of conditional handover (CHO) to improve reliability of the overall handover procedure. Many view the CHO procedure as a supplementary procedure to the conventional handover procedure to help reduce the handover failure rate. With the introduction of CHO, there are many potential challenges, including increased signaling overhead, radio resource waste due to unused CHO commands, network controllability, and unpredictable UE behaviors. Details of the CHO procedure still require further clarification.

Applying the CHO procedure may result in increased signaling overhead due to early measurement reports for CHO preparation and waste of the unused CHO command(s). For preparing a CHO command, the measurement configurations with relaxed thresholds to notify the source base station and prepare a potential target cell are required. Simultaneously, the measurement configurations with higher thresholds may be still given for triggering the conventional Handover (HO) procedure.

Radio resource waste due to unused CHO commands may depend on how long a UE keeps one or more stored CHO commands and how long the corresponding target base station needs to keep the reserved resources, such as dedicated random access (RA) resources and new cell radio-network temporary identifiers (C-RNTIs).

Without exerting any control by the network on a UE during a CHO procedure, a UE may select a CHO command of which a triggering condition for handover is fulfilled. If the UE performs a handover procedure based on the selected CHO command, the network may not receive a notification of the handover procedure from the UE. As a result, the network may not timely forward data, for example, of an ongoing data transfer to the target base station selected by the UE based on the selected CHO command. As a result, the serving base station may lose control over wireless communications, at least temporarily, with one or more UEs.

In terms of the unpredictability of UE behaviors, for example, when multiple CHO commands fulfill their triggering conditions, the UE may arbitrarily select one of the triggered CHO commands, and subsequently a target cell, for the handover procedure. However, the source base station may not know of the UE's executing a triggered CHO command or selection of the target cell. As a result, the source base station does not know the exact timing of when to stop downlink data transmission to the UE and/or to start data forwarding to the target base station, which may not even know in advance. Another aspect of the unpredictable UE behaviors is what happens if a CHO procedure fails.

Thus, there is a need in the art to address the above-mentioned problems associated with conditional handover procedures.

SUMMARY

The present disclosure is directed to conditional handover procedures.

In a first aspect of the present application, a method of a conditional handover (CHO) procedure for a user equipment (UE) is disclosed, the method comprising: receiving and storing, by the UE, one or more CHO commands from a source base station, the one or more CHO commands each having at least one triggering condition for conditional handover to one or more candidate target cells; evaluating, by the UE, whether the at least one triggering condition in any of the one or more CHO commands is fulfilled; transmitting, by the UE, a CHO notification to the source base station based on the evaluation; wherein at least one of the one or more CHO commands includes at least one of: a leaving condition, a target cell identity (ID), a life timer, a CHO command priority, a CHO command ID, one or more dedicated random access channel (RACH) configurations, or one or more common RACH configurations.

In an implementation of the first aspect, the method further comprises executing, by the UE, the at least one of the one or more CHO commands to connect to the one or more candidate target cells when the at least one triggering condition is fulfilled.

In another implementation of the first aspect, the method further comprises waiting, by the UE, to receive an instruction from the source base station on whether to execute the at least one of the one or more CHO commands when the at least one triggering condition is fulfilled.

In yet another implementation of the first aspect, the instruction from the source base station includes: a confirmation, to the UE, to execute the at least one of the one or more CHO commands; a refusal, to the UE, to execute the at least one of the one or more CHO commands; a CHO execution command instructing the UE to execute a CHO command from the one or more CHO commands that is different from the at least one of the one or more CHO commands indicated in the CHO notification; or a conventional handover command instructing the UE to connect to a target cell, wherein the conventional handover command is a handover command without a triggering condition and is not any of the one or more CHO commands.

In yet another implementation of the first aspect, upon receiving an instruction from the source base station, the UE executes one of the one or more CHO commands; executes a conventional handover command; stops executing an on-going CHO command when a CHO execution command is received, and executes a corresponding CHO command indicated by the CHO execution command; or stops executing an on-going CHO command when a conventional handover command is received, and executes the conventional handover command.

In yet another implementation of the first aspect, a response timer starts running, when the UE transmits the CHO notification to the source base station.

In yet another implementation of the first aspect, when the response timer expires and the UE has not received an instruction from the source base station, the UE executes the at least one of the one or more CHO commands to connect to the one or more candidate target cells.

In yet another implementation of the first aspect, the at least one of the one or more CHO commands is invalid or released, when: the leaving condition is fulfilled; the CHO procedure is successfully performed; a refusal to execute the at least one of the one or more CHO commands indicated in the CHO notification is received; a received conventional handover command is successfully performed; or the life timer expires.

In yet another implementation of the first aspect, when more than one of the at least one triggering condition in the one or more CHO commands are fulfilled, the UE prioritizes the one or more CHO commands based on the CHO command priority, and executes the CHO command having the highest CHO command priority.

In yet another implementation of the first aspect, the CHO command ID included in a CHO notification corresponds to: a CHO command executed by the UE; or a CHO command having at least one triggering condition fulfilled.

In yet another implementation of the first aspect, in response to unsuccessfully connecting to the one or more candidate target cells, the UE is configured to perform at least one of the following: performing a radio resource control (RRC) connection re-establishment procedure; executing another triggered CHO command; or sending a CHO failure report to the source base station.

In a second aspect of the present application, a User Equipment (UE) is disclosed, the UE comprising: one or more non-transitory computer-readable media having computer-executable instructions embodied thereon; and at least one processor coupled to the one or more non-transitory computer-readable media, and configured to execute the computer-executable instructions to: receive and store one or more CHO commands from a source base station, the one or more CHO commands each having at least one triggering condition for conditional handover to one or more candidate target cells; evaluate whether the at least one triggering condition in any of the one or more CHO commands is fulfilled; transmit a CHO notification to the source base station based on the evaluation; wherein at least one of the one or more CHO commands includes at least one of: a leaving condition, a target cell identity (ID), a life timer, CHO command priority, a CHO command ID, one or more dedicated random access channel (RACH) configurations, or one or more common RACH configurations.

In an implementation of the second aspect, the at least one processor is further configured to execute the computer-executable instructions to: execute the at least one of the one or more CHO commands to connect to the one or more candidate target cells when the at least one triggering condition is fulfilled.

In another implementation of the second aspect, the at least one processor is further configured to execute the computer-executable instructions to: wait to receive an instruction from the source base station on whether to execute the at least one of the one or more CHO commands when the at least one triggering condition is fulfilled.

In yet another implementation of the second aspect, the instruction from the source base station includes: a confirmation, to the UE, to execute the at least one of the one or more CHO commands; a refusal, to the UE, to execute the at least one of the one or more CHO commands; a CHO execution command instructing the UE to execute a CHO command from the one or more CHO commands that is different from the at least one of the one or more CHO commands indicated in the CHO notification; or a conventional handover command instructing the UE to connect to a target cell, wherein the conventional handover command is a handover command without a triggering condition and is not any of the one or more CHO commands.

In yet another implementation of the second aspect, upon receiving an instruction from the source base station, the at least one processor is further configured to execute the computer-executable instructions to: execute one of the one or more CHO commands; execute a conventional handover command; stop executing an on-going CHO command when a CHO execution command is received, and execute a corresponding CHO command indicated by the CHO execution command; or stop executing an on-going CHO command when a conventional handover command is received, and execute the conventional handover command.

In yet another implementation of the second aspect, a response timer starts running, when the UE transmits the CHO notification to the source base station.

In yet another implementation of the second aspect, when the response timer expires and the UE has not received an instruction from the source base station, the UE executes the at least one of the one or more CHO commands to connect to the one or more candidate target cells.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
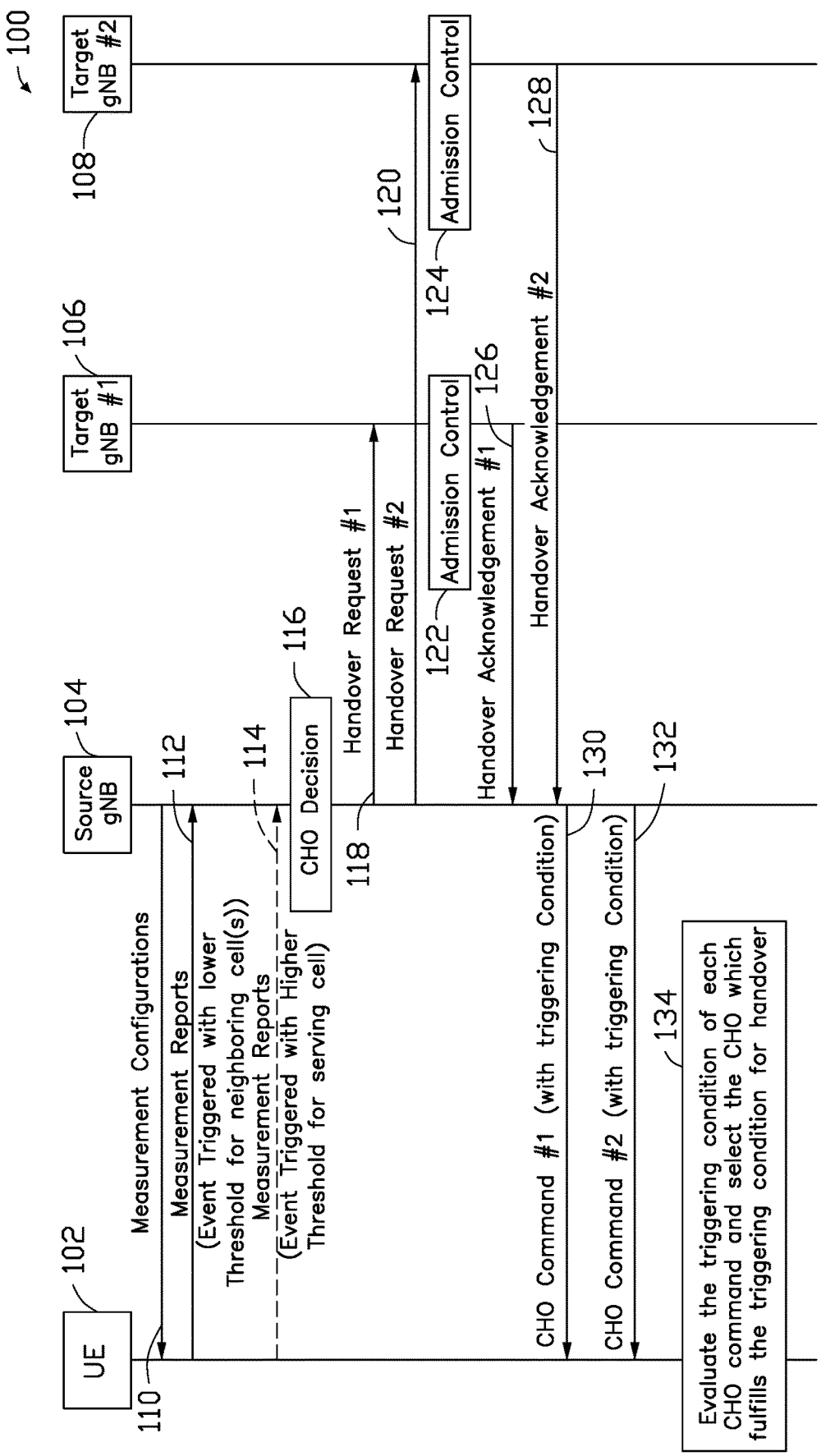
FIG. 1 is a diagram illustrating a CHO procedure, according to an example implementation of the present application.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA base station in connection with the 5GC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells. In MR-DC cases, the primary cell of an MCG or an SCG may be called as SpCell. PCell may refer to the SpCell of an MCG. PSCell may refer to the SpCell of an SCG. MCG means a group of serving cells associated with the MN, comprising of the SpCell and optionally one or more secondary cells (SCells). SCG means a group of serving cells associated with the SN, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

FIG. 1 is a diagram illustrating a CHO procedure, according to an implementation of the present application. Diagram 100 includes UE 102, source base station (e.g., gNB) 104, target base station (e.g., gNB) 106, and target base station (e.g., gNB) 108. It should be noted that although the source and target base stations in FIG. 1 and the following figures are shown, and described, as the next generation NodeBs (gNBs), the source and target base stations may be any combination of other types of base stations in some of the present embodiments. For example, any of the source and/or target based stations may be an evolved NodeB (eNB) in some of the present embodiments. That is, in some of the present embodiments, source base station 104 may be an eNB, while target base station 106 may be a gNB (or an eNB) and target base station 108 may be an eNB (or a gNB). Conversely, source base station 104 may be a gNB, while target base station 106 may be an eNB (or a gNB) and target base station 108 may be a gNB (or an eNB).

As shown in diagram 100, in action 110, source base station 104 may provide measurement configurations to UE 102, where the measurement configurations may include relaxed threshold(s) to trigger early measurement reports for determining potential target cell(s) for a handover. For example, a relaxed threshold may be a lower threshold for neighboring cells and/or a higher threshold for the serving cell for a measurement event which may trigger the measurement report(s).

In action 112, UE 102 may send a measurement report(s) to source base station 104 when a measurement event criterion is met (e.g., when an event is triggered by a lower threshold set for a neighboring cell(s)). In action 114, UE 102 may send another measurement report(s) to source base station 104 when another measurement event criterion is met, for example, when another event is triggered by a higher threshold set for the serving cell or primary Cell (e.g., when the serving cell quality drops lower than a preconfigured threshold or when the primary cell quality drops lower than a preconfigured threshold).

In action 116, after receiving the measurement reports from UE 102, source base station 104 may make a CHO decision in action 116. Thereafter source base station 104 may send a corresponding Handover Request message to each of the potential target base stations. In diagram 100, source base station 104 may send Handover Request message #1 to target base station 106 in action 118. Source base station 104 may also send Handover Request message #2 to target base station 108 in action 120.

In actions 122 and 124, target base stations 106 and 108, respectively, may perform admission control procedures. Thereafter, in action 126, target base station 106 may send Handover Acknowledgement message #1 to source base station 104 when target base station 106 accepts the handover request from source base station 104. Similarly, in action 128, target base station 108 may send Handover Acknowledgement message #2 to source base station 104 when target base station 108 accepts the handover request from source base station 104. Thereafter, source base station 104 may send CHO command #1 (or CHO configuration) to UE 102 in action 130 in response to Handover Acknowledgement message #1, and CHO command #2 (or CHO configuration) to UE 102 in response to Handover Acknowledgement message #2 in action 132. Each of the CHO commands may include at least one triggering condition for a CHO procedure.

After receiving the CHO command message(s), in action 134, UE 102 may start evaluating the triggering condition(s) to determine whether a triggering condition(s) for the CHO command message(s) is met, while continuing operating in its current RRC configuration. When UE 102 determines that a triggering condition is fulfilled, UE 102 may apply the corresponding CHO command to connect to the target cell (e.g., to target base station 106 or 108).

In some aspects of the present embodiments, after admission control, a target base station may transmit Handover Acknowledgement with CHO command (or CHO configuration) in a container to the source base station. The source base station and/or the target base station may then transmit the CHO command(s) to the UE. The CHO command(s) may include at least one of the following: a triggering condition, a leaving condition, a target cell ID, a carrier frequency (e.g., NR-Absolute Radio Frequency Channel Number (ARFCN)) of the target cell, a life time of the CHO, a handover priority (i.e., HO priority, or CHO command priority), a CHO command ID, dedicated Random Access Channel (RACH) configuration(s), and common RACH configuration(s) (e.g., for optionally providing resources for a contention-free random access). It should be noted that in some aspects of the present embodiments, the information in a CHO command may be provided by the source base station, while in other aspects of the present embodiments, the information in the CHO command may be provided by the target base station. In, yet some implementations of the present embodiments, some information of the CHO command (e.g., triggering condition(s), a CHO command ID, a handover priority, etc.) may be provided by the source base station, while other information of the CHO command (e.g., a target cell ID, a carrier frequency, such as an NR-Absolute Radio Frequency Channel Number (ARFCN), of the target cell, a life time of the CHO, dedicated Random Access Channel (RACH) configuration(s), common RACH configuration(s), etc.) may be provided by the target base station.

According to an implementation of the present application, a triggering condition may be used to determine whether a corresponding CHO command can be executed. The UE may continuously evaluate the triggering condition of each CHO command that remains valid. If a triggering condition is satisfied (e.g., a target cell signal quality is above a given threshold within a time period TTT), the UE may select from one of the following options (e.g., based on the NW configuration, based on predefined configuration, etc.):

(1) The UE may directly execute the corresponding CHO command without any notification to the source base station.

(2) The UE may directly execute the corresponding CHO command and notify the source base station about the triggered CHO command so that the source base station may stop the downlink data transmission to the UE (e.g., if the CHO command does not configure the make-before-break feature) and start forwarding the data to the target base station in response to the triggered CHO command. This option may enhance network controllability. In some of the present embodiments, after the UE initiates executing the CHO command and performs synchronization and random access (RA) procedures for the selected target base station, the UE may send an indication message to the target base station (and the source base station). After reception of this indication message, the source base station may perform a Sequence Number (SN) status transfer and data forwarding (e.g., to the target base station).

(3) The UE may first notify the source base station about the triggered CHO command and wait for a configured or predefined response timer to expire before executing the triggered CHO command. While the response timer is running, the source base station may allow the execution of the triggered CHO command, transmit a different handover command to the UE, or refuse the execution of the triggered CHO command. However, if the response timer expires and there is still no response from the source base station, the UE may consider that the serving cell quality has dropped rapidly such that no response can be received. In this case, the UE may perform the triggered CHO command. It should be noted that the response timer may be configured by the source base station, the target base station, or may be predefined. Also, each CHO command may be associated with a corresponding response timer.

Figure 2:
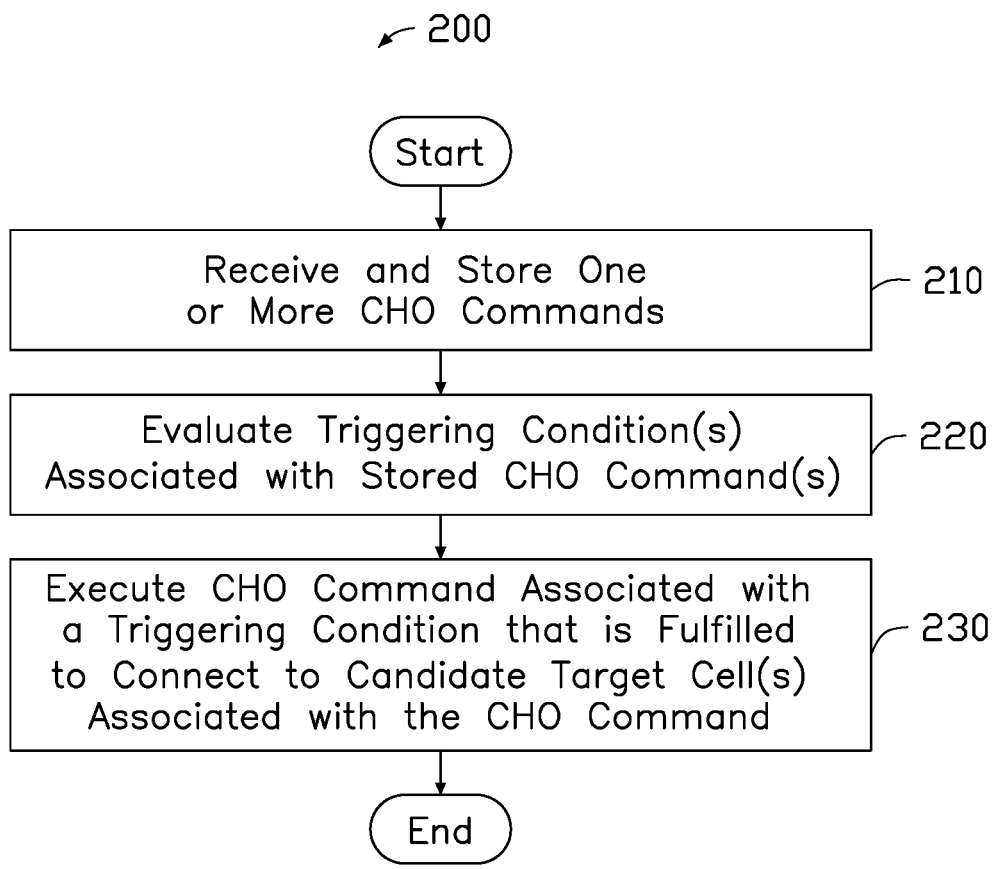
FIG. 2 is a flowchart illustrating a method of performing a CHO procedure, according to an example implementation of the present application.

FIG. 2 is a flowchart illustrating a process/method 200 of performing a CHO procedure, according to an example implementation of the present application. In some of the present embodiments, the process 200 may be performed by a UE (e.g., may be executed by one or more processors of the UE). The process 200, in some of the present embodiments, may start by receiving and storing, in action 210, one or more CHO commands. The CHO command(s) may be received, for example, from a source base station (e.g., a gNB or an eNB), and may be stored at the UE (e.g., one or more local memories of the UE). Each of the CHO commands may include one or more triggering conditions for a conditional handover to a target cell (e.g., associated with a target gNB or a target eNB).

In action 220, the process 200 may start evaluating the triggering condition(s) associated with each stored CHO command. That is, in some of the present embodiments, the process 200 may continuously determine whether any of the triggering conditions associated with each of the CHO commands is met (or fulfilled). For example, a triggering condition for a target cell may be the target cell's signal quality being above a certain (or predefined) threshold within a certain (or predefined) time period. As such, the process 200 may continuously determine whether the target cell's signal quality has gone above the predefined threshold within the predefined time period.

When the process 200 determines that at least one of the triggering conditions has been fulfilled, the process 200 may, in action 230, execute the CHO command that is associated with the triggering condition in order to connect to one or more (candidate) target cells associated with the CHO command. In some of the present embodiments, the process 200 may transmit a CHO notification to the source base station and wait for an instruction from the source base station to execute the CHO command (as discussed below with reference to FIG. 3), while in other embodiments, the process 200 may send the CHO notification to the source base station after the execution of the CHO command.

Figure 3:
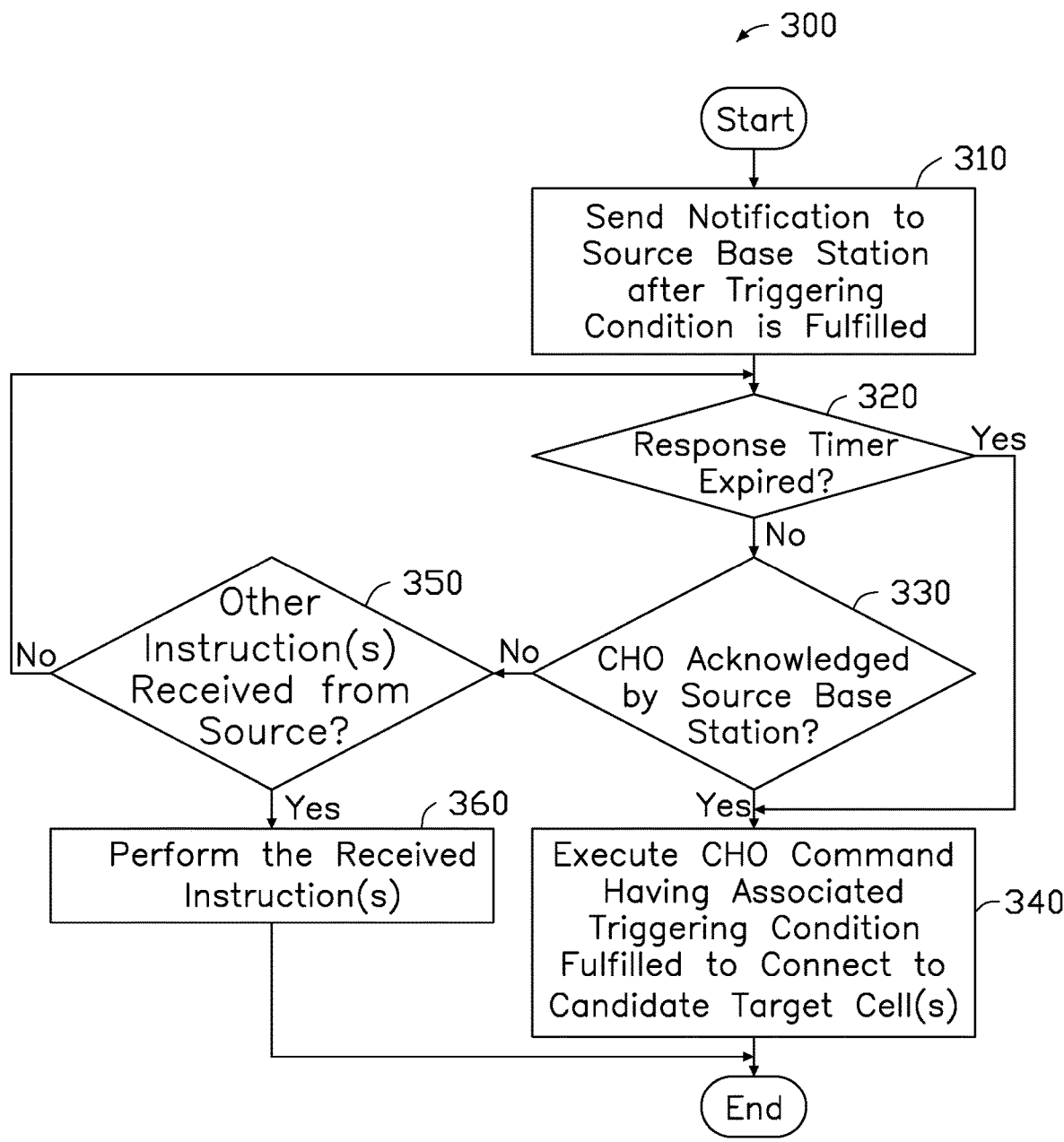
FIG. 3 is a flowchart illustrating another method of performing a CHO procedure, according to an example implementation of the present application.

FIG. 3 is a flowchart illustrating a process/method 300 of performing a CHO procedure, according to another example implementation of the present application. In some of the present embodiments, the process 300 may be performed by a UE (e.g., may be executed by one or more processors of the UE). The process 300, in some of the present embodiments, may start after the first two actions 210 and 220 (with reference to FIG. 2) are performed. That is, the process 300 may first (before action 310) receive one or more CHO command(s), that may include one or more triggering conditions for a conditional handover to a target cell, from a source base station.

After determining that at least one triggering condition associated with a CHO command is met (or fulfilled), the process 300 may send, in action 310, a notification to the source base station informing the source base station of the triggering condition associated with the CHO command being fulfilled. In some of the present embodiments, upon sending the notification to the source base station, the process 300 may start a response timer associated with the CHO command. In some aspects of the present embodiments, each CHO command may be associated with a separate response timer (e.g., having the same value as, or different value from, the other response timers). In some of the present embodiments, the values of the response timers may be received from the source base station and/or the target base station (e.g., the values may be included in the CHO commands). The process 300 may then determine, in action 320, whether a response timer associated with the CHO command has been expired. As described above, the response timer may have been defined previously based on the NW configuration and/or based on predefined conditions. The response timer, in some of the present embodiments, may be configured by the source base station or the target base station. Additionally, for each CHO command a different response timer may be configured (or defined) in some of the present embodiments.

As described above, during the time period that the response timer is running, in some of the present embodiments, the source base station may allow the execution of the triggered CHO command, transmit a different handover command to the UE, or refuse the execution of the triggered CHO command.

With continued reference to FIG. 3, when the process 300 determines, in action 320, that the response timer has expired (and there is still no response from the source base station), the process may execute, in action 340, the CHO command that is associated with the triggering condition which is fulfilled, in order to connect to one or more (candidate) target cells associated with the CHO command. This is because, for example, the process may determine that the serving cell quality associated with the source base stations may have been dropped so abruptly that no response can be received. The process may then end.

When the process 300 determines, in action 320, that the response timer has not expired yet, the process may determine, in action 330, whether an acknowledgement for execution of the CHO command is received from the source base station. When the process 300 determines that an acknowledgement has been received, the process may execute, in action 340, the CHO command that is associated with the triggering condition which is fulfilled. Otherwise, when the process 300 determines that no acknowledgement has been received (and the response timer is still active and running), the process may determine, in action 350, whether any other type of instruction has been received from the source base station.

When the process determines that no other type of instruction has been receive, the process 300 may loop back to action 320 to determine the expiration of the response timer. On the other hand, when the process determines, in action 350, that an instruction has been received from the source base station, the process may perform, in action 360, the received instruction in some of the present embodiments. The instruction(s), in some of the present embodiments, may include, but is not limited to, a refusal instruction to the UE for executing at least one of the one or more CHO commands, an execution command instructing the UE to execute a CHO command from the one or more CHO commands (e.g., a CHO command that is different from the one or more CHO commands indicated in the CHO notification), a conventional handover command instructing the UE to connect to a target cell, etc. For example, as described above, after receiving the notification from the UE, and while the response timer is active and running, the source base station may transmit a different handover command to the UE. As such, the process 300 may execute, in action 360, the different handover command that is received from the source base station. The process may then end.

According to an implementation of the present application, a leaving condition may be used to determine whether a CHO command, and the radio resources associated with the CHO command, may be invalid and may be released. If a leaving condition is present, a UE may continuously evaluate the leaving condition associated with each CHO command. When the leaving condition is satisfied (e.g., the target cell signal quality is below a given threshold within a time period TTT), the UE may consider the corresponding CHO command as being invalid and release radio resources associated with the CHO command. Once a CHO command becomes invalid, the UE may select one of the following options (e.g., based on the NW configuration, based on predefined configuration, etc.):

(1) Once a CHO command is released by the UE, the UE may notify the source base station about the released CHO command. In response to the notification, the source base station may inform the related target base station to release the reserved resource(s) for the UE (e.g., the dedicated RA resource (or the dedicated PRACH occasions), the new C-RNTI needed when the UE connects to the target cell, etc.).

(2) Once a CHO command is released by the UE, the UE may not notify the invalid CHO command to the source base station. It should be noted that the UE may be required to continuously measure the corresponding base station's quality, or the corresponding neighboring cell's quality, where the measurement configurations are independent of the CHO validity.

According to an implementation of the present application, a target cell ID may be used to indicate which cell is the target cell for handover.

According to an implementation of the present application, a carrier frequency (e.g., NR-ARFCN) may be used to indicate the carrier frequency to be used by a UE in a target cell. Other related information, such as uplink bandwidth and downlink bandwidth, necessary system information (SI), etc., may also be included in a CHO command.

According to an implementation of the present application, a life timer may be included in a CHO command to indicate a time period during which a corresponding CHO command remains valid. If the life timer of a CHO command is present, the UE may consider the CHO command as being valid until the life timer expires. The life timer may start when the UE receives the corresponding CHO command. In one implementation, the life timer and the leaving condition may coexist. For example, in some of the present embodiments, if a leaving condition of a CHO command is fulfilled but the life timer of the CHO command is still running, the CHO command may be considered as being invalid and be released. It should be noted that each CHO command may be associated with a specific life timer, and the life timers may be running independently. If a life timer is not present or set to infinite, the CHO command would always be valid until a handover procedure is performed (e.g., the CHO command may be released after the HO procedure).

According to an implementation of the present application, a handover priority may be used to indicate the priority of the CHO command. For example, when multiple CHO commands fulfill their triggering conditions, the CHO command with the highest CHO command priority (also referred to as "HO priority" for brevity in the present disclosure) may be executed first in some of the present embodiments. In some aspects of the present embodiments, if there are more than one triggered CHO commands with the same HO priority, the CHO command with the highest target cell signal quality (e.g., on RSRP level) may have the first priority (i.e., may be executed first). Alternatively, if there are more than one triggered CHO commands with the same HO priority, in some of the present embodiments, the UE may select one of the CHO commands to execute. In one aspect of the present embodiments, when the HO priority of a CHO command is not present, the HO priority of the CHO command may be set to a default priority, or the HO priority may be set based on one or more predefined rules.

According to an implementation of the present application, a CHO command ID may be used as an identification for a received CHO command. A UE may receive multiple CHO commands (for multiple candidate target base stations) from the source base station. To simplify notifications between the UE and the source base station with regard to the trigger/execution of a CHO command, the UE may use a CHO command ID for related signaling.

According to an implementation of the present application, a dedicated RACH configuration may be used to indicate the dedicated RA resources (or the dedicated PRACH occasions) for contention-free random access. If the UE fails to use the dedicated RA resources (or the dedicated PRACH occasions) to access the target cell, the UE may fall back to using the common RA resources (or the common PRACH occasions) indicated by the common RACH configurations.

According to an implementation of the present application, the common RACH configurations may be used to indicate the common RACH resources (or the common PRACH occasions) for contention-based random access.

Figure 4:
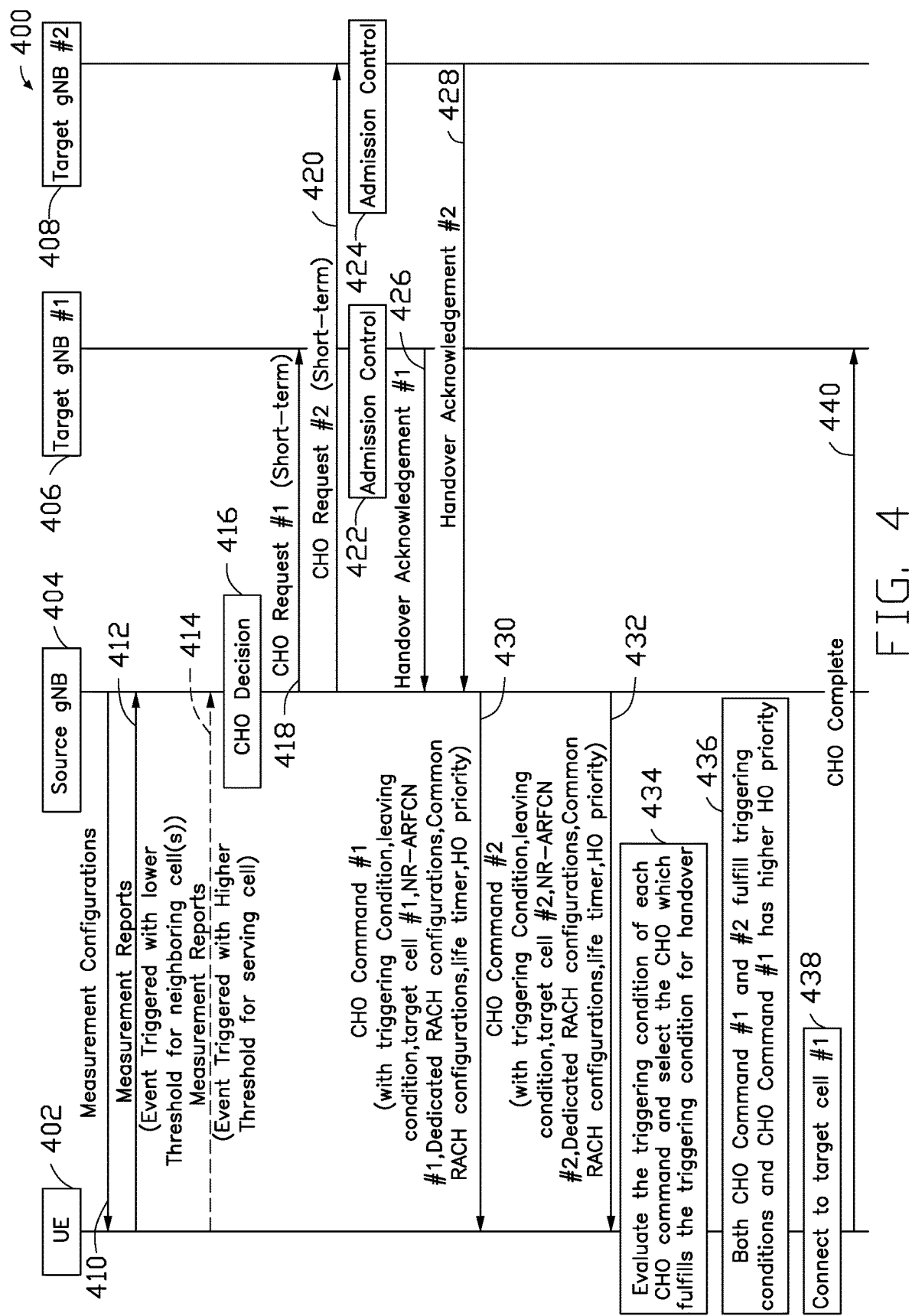
FIG. 4 is a diagram illustrating a CHO procedure with a short-term CHO command, in accordance with an exemplary implementation of the present application.
Figure 5:
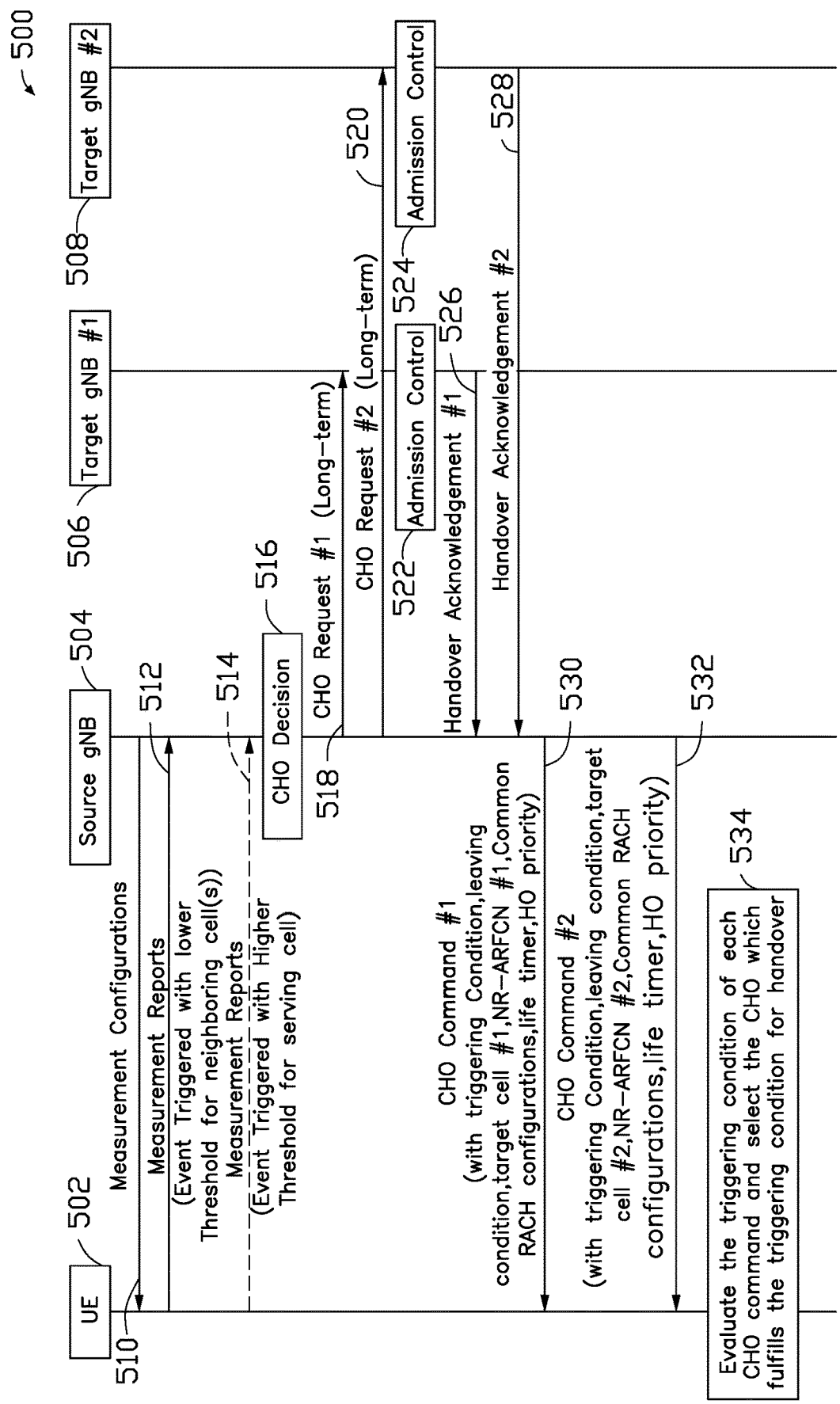
FIG. 5 is a diagram illustrating a CHO procedure with a long-term CHO command, in accordance with an exemplary implementation of the present application.

The following implementations, in FIGS. 4 and 5, show exemplary CHO procedures with a short-term CHO Request and a long-term CHO Request. Based on a UE's behaviors, in some of the present embodiments, a source base station may send a CHO Command Request to a target base station to request for either a short-term or a long-term CHO Command (or CHO configurations). The target base station may then select the parameters and/or configurations to be included in the CHO Command.

Referring to FIG. 4, FIG. 4 is a diagram illustrating a CHO procedure with a short-term CHO command, in accordance with an exemplary implementation of the present application. Diagram 400 includes UE 402, source base station (e.g., gNB) 404, target base station (e.g., gNB) 406, and target base station (e.g., gNB) 408.

As shown in diagram 400, in action 410, source base station 404 may provide measurement configurations to UE 402. The measurement configurations may include relaxed threshold(s) to trigger early measurement reports for determining potential target cell(s) for handover. Some of the measurement configurations may be associated with relaxed thresholds for early measurement reports for CHO conditions, while other configurations may be associated with normal thresholds for conventional HO conditions. For example, a relaxed threshold may be a lower threshold for the neighboring cells and/or a higher threshold for the serving cell for a measurement event that may trigger the measurement report(s).

Source base station 404 may receive some early measurement reports indicating some potential target cells for HO in actions 412 and 414. In action 412, UE 402 may send a measurement report(s) to source base station 404 when a measurement event criterion is met (e.g., when an event is triggered by a lower threshold set for the neighboring cells). In action 414, UE 402 may send another measurement report(s) to source base station 404 when another measurement event criterion is met. For example, when another event is triggered by a higher threshold set for the serving cell (e.g., when the serving cell quality is lower than a preconfigured threshold).

After making the CHO decision in action 416 by considering different factors, such as the UE mobility state, UE targeting services, traffic load condition, source base station's coverage and other statistical information, source base station 404 may send CHO Command Request(s) (or CHO Request(s)) to the corresponding target base station(s). For each CHO Request, the source base station may also indicate whether a requested CHO command is a long-term command or a short-term one.

As shown in FIG. 4, in actions 418 and 420, source base station 404 may send short-term CHO Request #1 and short-term CHO Request #2 to target base stations 406 and 408, respectively. For example, if UE 402 is moving fast and targeting in URLLC services, source base station 404 may send a short-term CHO Request to each of target base stations 406 and 408.

In response, after admission control in action 422, target base station 406 may send a Handover Acknowledgement #1 containing a short-term CHO command (or a short-term CHO configurations) with necessary information for the UE to connect to the target cell, such as Dedicated RACH configurations, target cell ID and a life timer to source base station 404. In some of the present embodiments, the value of the life timer is determined by target base station 406 based on the received CHO Command Request #1 from source base station 404. Target base station 406 may take source base station 404's short-team suggestion for reference and configure the life timer as a short-term life timer. After receiving Handover Acknowledgement #1 from target base station 406, source base station 404 may transmit CHO command #1 to UE 402 in action 430.

Similarly, after admission control in action 424, target base station 408 may send a Handover Acknowledgement #2 containing a short-term CHO command (or a short-term CHO configurations) with necessary information, such as Dedicated RACH configurations, target cell ID, and a life timer, to source base station 404. In some of the present embodiments, the value of the life timer is determined by target base station 408 based on the received CHO Command Request #2 from source base station 404. Target base station 408 may take source base station 404's short-term suggestion for reference and configure the life timer as a short-term life timer. After receiving Handover Acknowledgement #2 from target base station 408, source base station 404 may transmit CHO command #2 to UE 402 in action 432.

After the UE receives CHO commands #1 and #2, in action 434, UE 402 may start evaluating the triggering conditions and leaving conditions (if present) while the corresponding CHO command is still valid. Upon a triggering condition of a CHO command being fulfilled and the life timer (if configured) still running, UE 402 may execute the CHO command for handover. In case that there are multiple CHO commands fulfilling the corresponding triggering conditions, UE 402 may execute the CHO command with the highest HO priority, as shown in action 436. For example, when both CHO commands #1 and #2 fulfill the corresponding triggering conditions and the HO priority of CHO command #1 is higher than that of CHO command #2, UE 402 executes CHO command #1 to connect to target cell #1 of target base station 406, as shown in action 438. After successfully random access to target cell #1, UE 402 may transmit a CHO Complete message to target base station 406 in action 440. In one implementation, after the CHO command is executed and the HO is successful, other CHO commands (e.g., CHO command #2) stored in UE 402 may be released.

In one implementation, if the leaving condition of the CHO command is fulfilled or the life timer of a CHO command is expired, the corresponding CHO command may become invalid and thus may be released.

Referring to FIG. 5, FIG. 5 is a diagram illustrating a CHO procedure with a long-term CHO command, in accordance with an exemplary implementation of the present application. Diagram 500 includes UE 502, source base station (e.g., gNB) 504, target base station (e.g., gNB) 506, and target base station (e.g., gNB) 508. As shown in diagram 500, actions 510, 512, 514, 516, and 534 may be substantially similar to actions 410, 412, 414, 416, and 434, respectively, in FIG. 4.

As shown in FIG. 5, in actions 518 and 520, source base station 504 sends long-term CHO Request #1 and long-term CHO Request #2 to target base stations 506 and 508, respectively. For example, UE 502 may be moving slowly but the statistical information tells that the serving cell quality is unstable based on UE 502's trajectory. As such, source base station 504 may send a request for a long-term CHO command to each target base station as shown in FIG. 5.

In response, after admission control in action 522, target base station 506 may send a Handover Acknowledgement #1 containing a long-term CHO command (or a long-term CHO configuration) with necessary information, such as Common RACH configurations, target cell ID, and a long-term life timer to source base station 504. In some of the present embodiments, the value of the life timer is determined by target base station 506 based on the received CHO Command Request #1 from source base station 504. Target base station 506 may take source base station 504's long-team suggestion for reference and configure the life timer as a long-term life timer. After receiving Handover Acknowledgement #1 from target base station 506, source base station 504 may transmit CHO command #1 to UE 502 in action 530.

Similarly, after admission control in action 524, target base station 508 may send a Handover Acknowledgement #2 containing a long-term CHO command (or a long-term CHO configurations) with Common RACH configurations, target cell ID, and a life timer to source base station 504. In some of the present embodiments, the value of the life timer is determined by target base station 508 based on the received CHO Command Request #2 from source base station 504. Target base station 508 may take source base station 504's long-team suggestion for reference and configure the life timer as a long-term life timer. After receiving Handover Acknowledgement #2 from target base station 508, source base station 504 may transmit CHO command #2 to UE 502 in action 532.

Figure 7:
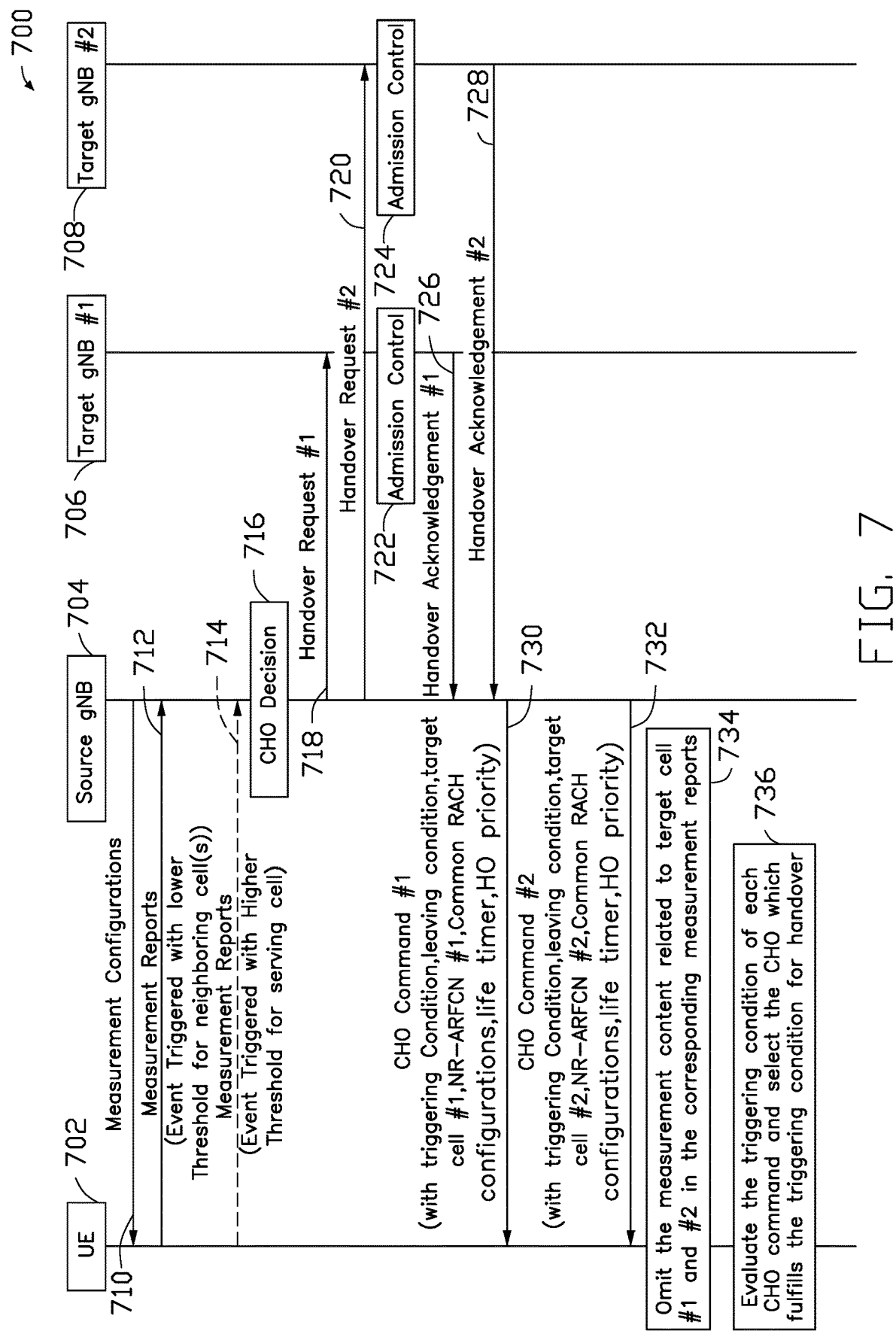
FIG. 7 is a diagram illustrating a CHO procedure that omits Measurement Content(s) of a target cell in response to a CHO Command, in accordance with an exemplary implementation of the present application.

To reduce the signaling overhead, the following implementations, in FIGS. 4 and 7, of the present application may reduce the number of measurement reports and the measurement content in measurement reports.

Figure 6:
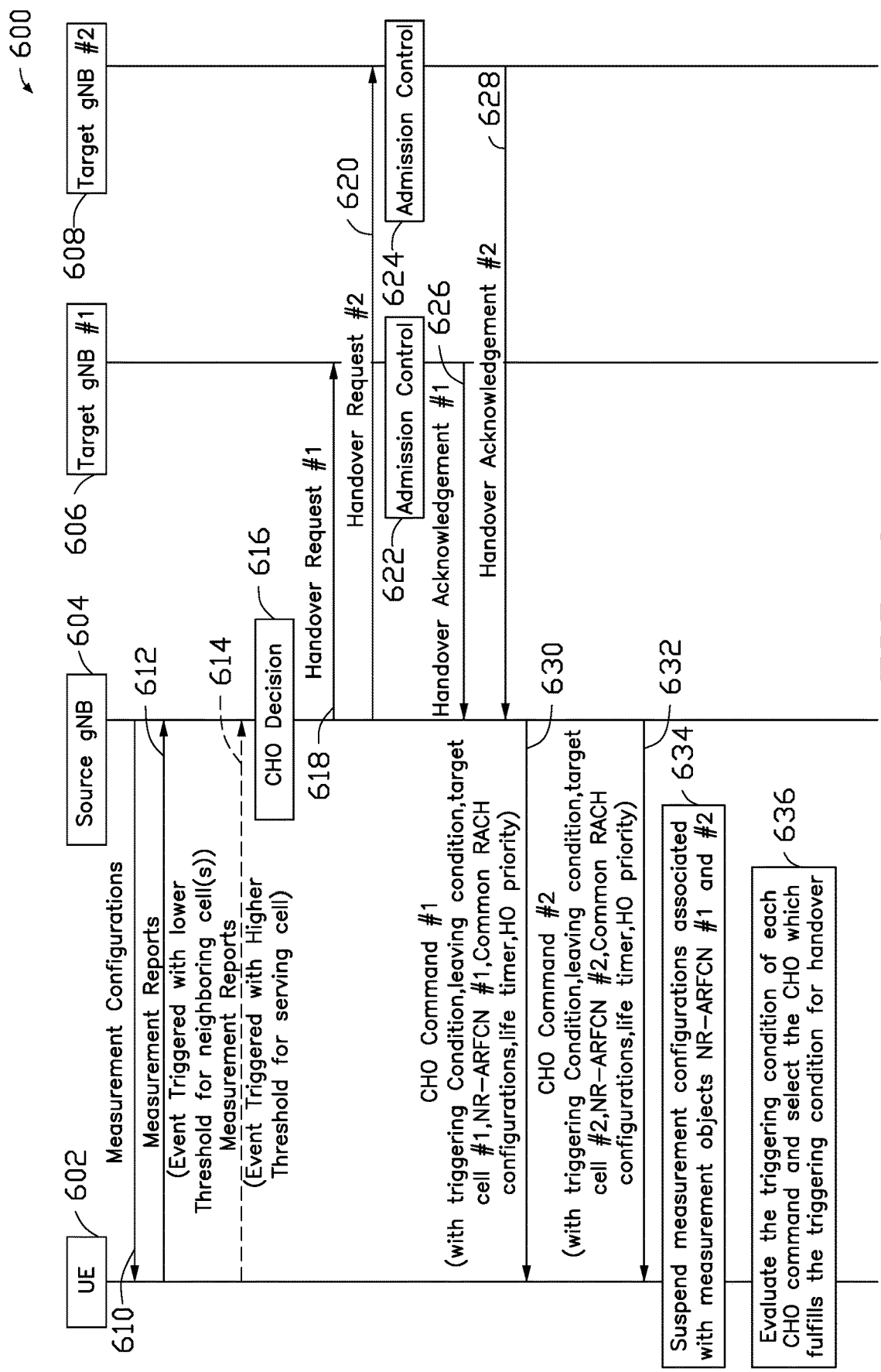
FIG. 6 is a diagram illustrating a CHO procedure that suspends measuring of certain Measurement Object(s) in response to a CHO Command, in accordance with an exemplary implementation of the present application.

Referring to FIG. 6, FIG. 6 is a diagram illustrating a CHO procedure that suspends measuring of certain Measurement Object(s) in response to a CHO Command, in accordance with an exemplary implementation of the present application. Diagram 600 includes UE 602, source base station (e.g., gNB) 604, target base station (e.g., gNB) 606, and target base station (e.g., gNB) 608.

As shown in diagram 600, actions 610, 612, 614, 616, 618, 620, 622, 624, 626, 628, and 636 may be substantially similar to actions 110, 112, 114, 116, 118, 120, 122, 124, 126, 128, and 134, respectively, in FIG. 1.

In the present implementation, UE 602 may suspend measuring and reporting a measurement object that is associated with the carrier frequency(ies) of the target cell of a received and stored CHO command, based on the measurement configurations. Consequently, UE 602 may only need to measure the triggering condition(s) of a measurement object that is associated with the carrier frequency(ies) of the target cell of the CHO command. It should be noted that in some of the present embodiments, suspending the measurement configurations associated with measurement objects related to the carrier frequency(ies) of the target cell(s) of the valid CHO command(s) by UE 602 may depend on source base station 604 configurations or a set of predefined rules. If a CHO Command is released by UE 602, UE 602 may resume measuring and reporting the measurement object that is associated with the target cell carrier frequency of the released CHO Command based on the measurement configurations.

As shown in FIG. 6, in action 630, UE 602 may receive CHO Command #1 from source base station 604 based on Handover Acknowledgement #1 from target base station 606. In action 632, UE 602 may receive CHO Command #2 from source base station 604 based on Handover Acknowledgement #2 from target base station 608. In action 634, UE 602 may suspend measurement configurations associated with the measurement object NR-ARFCN #1 (e.g., carrier frequency target cell #1, having target base station 606) and the measurement objects NR-ARFCN #2 (e.g., carrier frequency target cell #2, having target base station 608). However, in some of the present embodiments, the measurements for the triggering conditions for CHO Commands #1 and #2 may still be performed.

Referring to FIG. 7, FIG. 7 is a diagram illustrating a CHO procedure that omits Measurement Content(s) of a target cell in response to a CHO Command, in accordance with an exemplary implementation of the present application. Diagram 700 includes UE 702, source base station (e.g., gNB) 704, target base station (e.g., gNB) 706, and target base station (e.g., gNB) 708.

As shown in diagram 700, actions 710, 712, 714, 716, 718, 720, 722, 724, 726, 728 and 736 may be substantially similar to actions 110, 112, 114, 116, 118, 120, 122, 124, 126, 128 and 134, respectively, in FIG. 1.

In the present implementation, when a CHO Command is received, UE 702 may autonomously, or based on the source base station 704's configuration, omit the measurement content related to the target cell associated with the CHO command to reduce the measurement content in the corresponding measurement reports. The measurement content may include event-triggered measurement reports and/or periodical measurement reports. If a CHO Command is released by UE 702, UE 702 may add the measurement content associated with the target cell of the released CHO Command back into the corresponding measurement reports.

As shown in FIG. 7, in action 730, UE 702 receives CHO Command #1 associated with target cell #1 from source base station 704 based on Handover Acknowledgement #1 from target base station 706. In action 732, UE 702 receives CHO Command #2 associated with target cell #2 from source base station 704 based on Handover Acknowledgement #2 from target base station 708. In action 734, UE 702 may omit the measurement content related to target cells #1 and #2 in the corresponding measurement reports.

To increase network controllability, the following implementations, in FIGS. 8, 9, 10, 11, 12, 13, 14, 15, 16, 17, and 18, of the present application may provide mechanisms for a network to know or confirm a UE's decision with regard to a CHO. These mechanisms may be configured for the UE or may be predefined for the UE.

Figure 8:
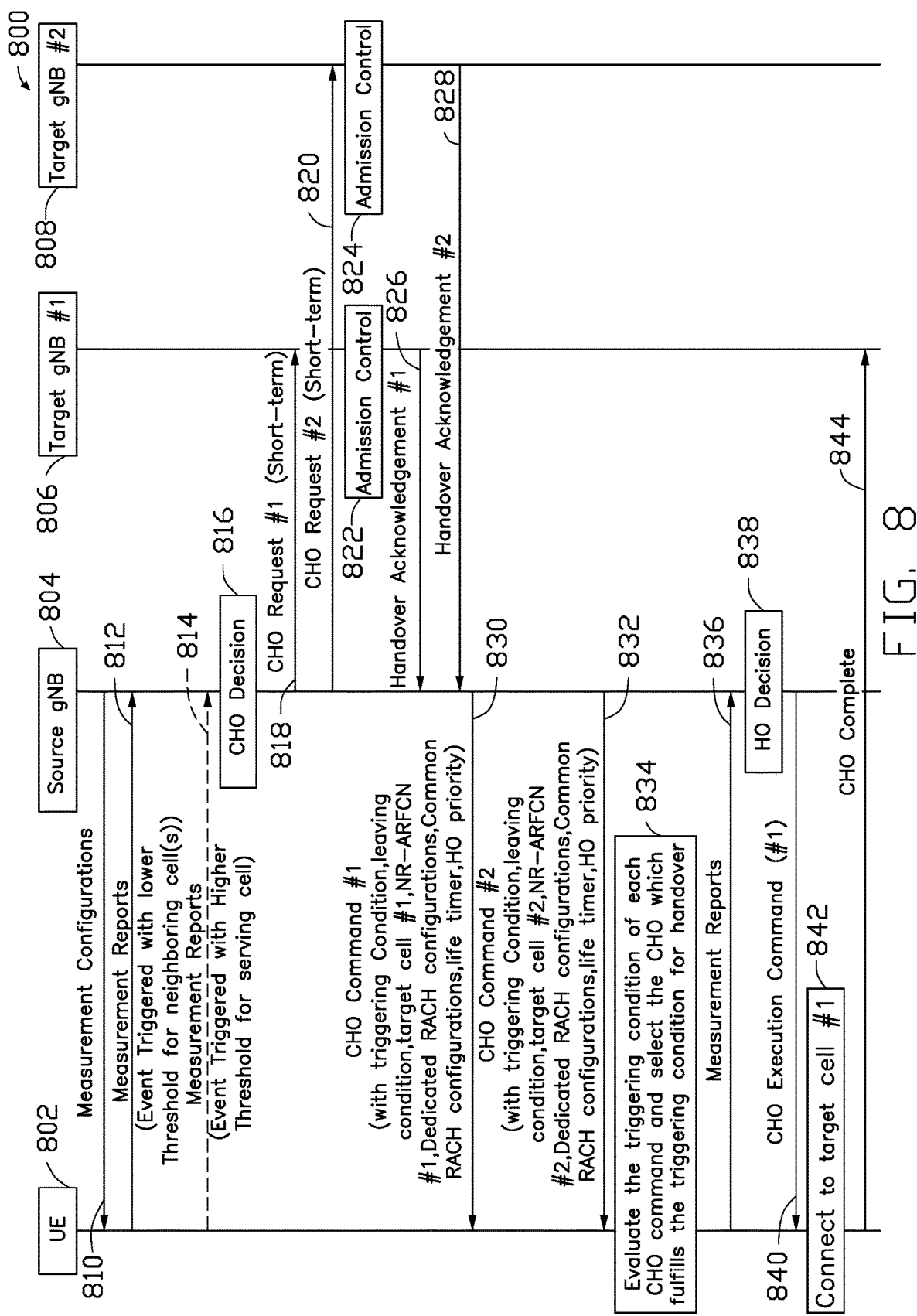
FIG. 8 is a diagram illustrating a CHO procedure having a CHO Execution Command, in accordance with an exemplary implementation of the present application.

Referring to FIG. 8, FIG. 8 is a diagram illustrating a CHO procedure having a CHO Execution Command, in accordance with an exemplary implementation of the present application. Diagram 800 includes UE 802, source base station (e.g., gNB) 804, target base station (e.g., gNB) 806, and target base station (e.g., gNB) 808.

As shown in diagram 800, actions 810, 812, 814, 816, 818, 820, 822, 824, 826, 828, 830, 832 and 834 may be substantially similar to actions 410, 412, 414, 416, 418, 420, 422, 424, 426, 428, 430, 432 and 434, respectively, in FIG. 4.

In the present implementation, source base station 804 is configured to make the HO decision, and send CHO Execution Command to UE 802 to instruct UE 802 to execute one of the received CHO Commands from source base station 804. Since source base station 804 has information about the conditions of the whole system, including the load information of target base stations 806 and 808, source base station 804 may be in a better position to make decision on behalf of UE 802, and control the entire HO procedure, and, at the same time, be able to save time for negotiating with the target base stations via X2/Xn interface to reduce the possibility of Handover Command failure.

As shown in FIG. 8, UE 802 receives CHO Commands #1 and #2 in actions 830 and 832, respectively. In action 834, UE 802 may evaluate the triggering condition and leaving condition (if present) for each CHO Command, while the corresponding CHO commands are still valid. Upon the triggering condition of a CHO command is fulfilled and the life timer (if configured) is still running, the UE may execute the CHO command for handover. However, even though UE 802 stores the CHO Commands (e.g., CHO Commands #1 and #2), source base station 804 may still a CHO Execution Command to UE 802 to instruct UE 802 to execute a specific stored CHO Command. In some of the present embodiments, even though UE 802 stores the CHO Commands (e.g., CHO Commands #1 and #2), source base station 804 may still transmit a conventional Handover Command message to UE 802 to instruct UE 802 to perform the received conventional Handover Command. Source base station 804 may decide to send the CHO Execution Command based on the latest measurement reports 836 (e.g., other event-triggered measurement reports and/or periodical measurement reports which may also report to source base station 804 based on the measurement configuration of source base station 804, when CHO command(s) are stored in UE 802). As shown in FIG. 8, in action 840, UE 802 may receive the CHO Execution Command to execute CHO Command #1 after source base station 804 makes an HO decision in action 838. In action 842, UE 802 may start a random access procedure to connect to target cell #1. In action 844, UE 802 may send a CHO Complete message to target base station 806. Alternatively, UE 802 may send a CHO Complete message to source base station 804. Once the HO is successful, other CHO command(s) stored in UE 802 may be released. In another embodiment, a CHO Command may be configured without a triggering condition, and the UE may just wait for the CHO Execution Command from source base station 804 and no evaluation for the triggering condition of a CHO Command is required.

Figure 9:
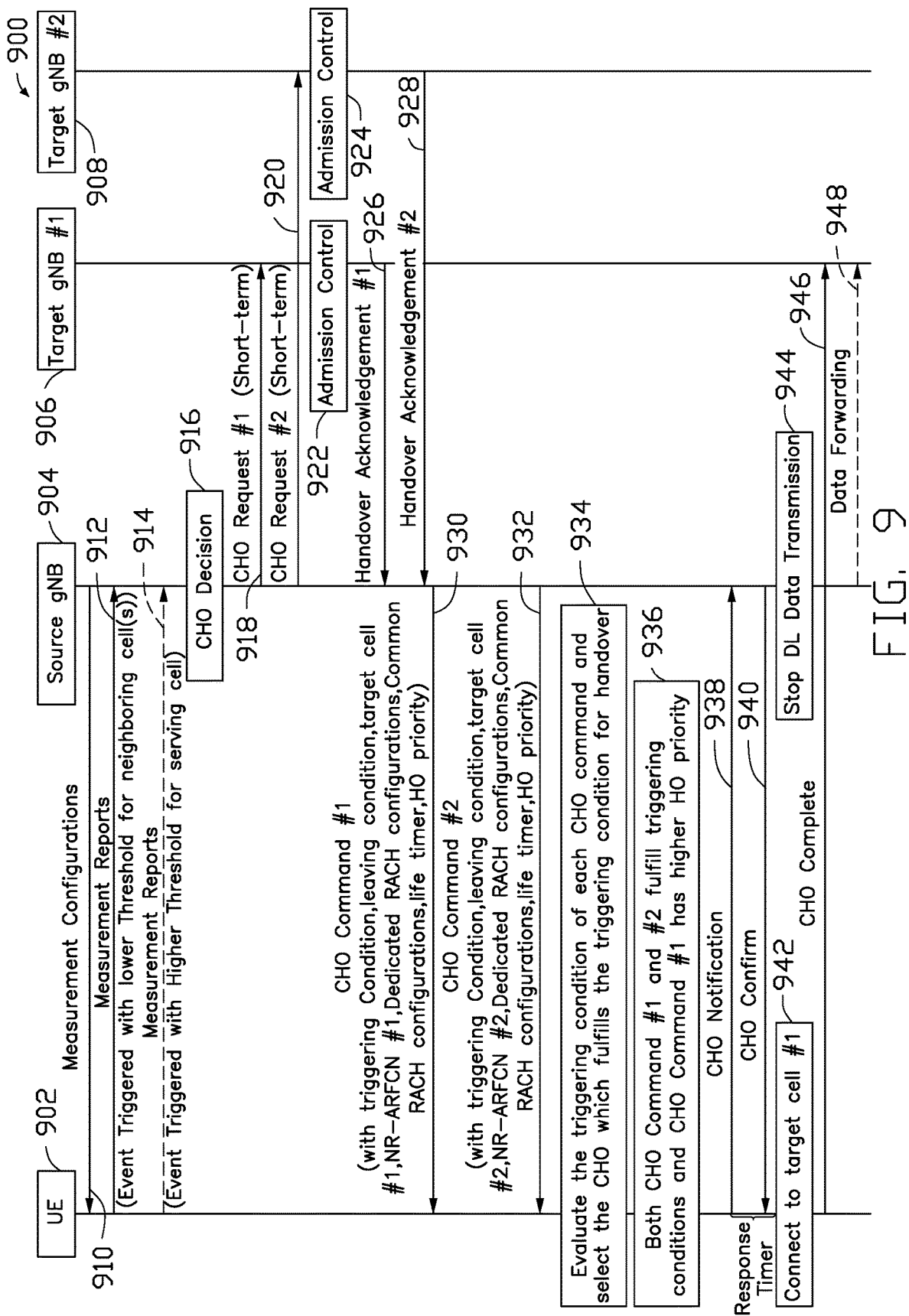
FIG. 9 is a diagram illustrating a CHO procedure having a CHO Notification message, a CHO Confirm message, and a response timer, in accordance with an exemplary implementation of the present application.

Referring to FIG. 9, FIG. 9 is a diagram illustrating a CHO procedure having a CHO Notification message, a CHO Confirm message, and a response timer, in accordance with an exemplary implementation of the present application. Diagram 900 includes UE 902, source base station (e.g., gNB) 904, target base station (e.g., gNB) 906, and target base station (e.g., gNB) 908.

As shown in diagram 900, actions 910, 912, 914, 916, 918, 920, 922, 924, 926, 928, 930, 932, and 934 may be substantially similar to actions 810, 812, 814, 816, 818, 820, 822, 824, 826, 828, 830, 832 and 834, respectively, in FIG. 8.

In action 936, both CHO Commands #1 and #2 fulfill their triggering conditions, while CHO Command #1 has a higher HO priority than CHO Command #2. In the present implementation, instead of directly executing CHO Command #1 to connect to target cell #1, in action 938, UE 902 may send a CHO Notification message to inform source base station 904 of the information of the triggered CHO Command #1. The CHO Notification message may include a CHO Command ID or the corresponding configuration of CHO Command #1. The CHO Command ID of each CHO Command may be assigned by source base station 904 and transmitted to UE 902 as part of the reconfiguration with the corresponding CHO Command.

When UE 902 sends the CHO Notification message to source base station 904, a response timer starts. The value of the response timer may be configured by source base station 904, by the target base station associated with the triggered CHO Command (e.g., target base station 906), or may be predefined. While the response timer is still running, source base station 904 may decide whether to allow the execution of the triggered CHO Command.

If source base station 904 considers that the triggered CHO command is acceptable, source base station 904, in action 940, may transmit a CHO Confirm message back to UE 902, while the response timer is still running. After UE 902 receives the CHO Confirm message, UE 902, in action 942, may execute the triggered CHO command to connect to target cell #1 associated with CHO Command #1, and the response timer stops. After sending the CHO Confirm message to UE 902, source base station 904 may stop downlink data transmission to UE 902 in action 944. In action 946, UE 902 may send a CHO Complete message to target base station 906. Alternatively, UE 902 may send a CHO Complete message to source base station 904. After transmitting CHO Confirm message to UE 902, or receiving a CHO Complete message from UE 902, source base station 904 may start data forwarding to target base station 906 in action 948. Once the HO is successful, other CHO command(s) stored in UE 902 may be released.

In another implementation, if source base station 904 considers that the triggered CHO command is not acceptable, source base station 904 may transmit a new handover command, or refuse the execution of the triggered CHO Command. In another implementation, if the response timer is expired, and no response from source base station 904 is received, UE 902 may determine that the serving cell quality has dropped rapidly such that no response can be received from source base station 904. In such a case, UE 902 may perform the triggered CHO Command.

Figure 10:
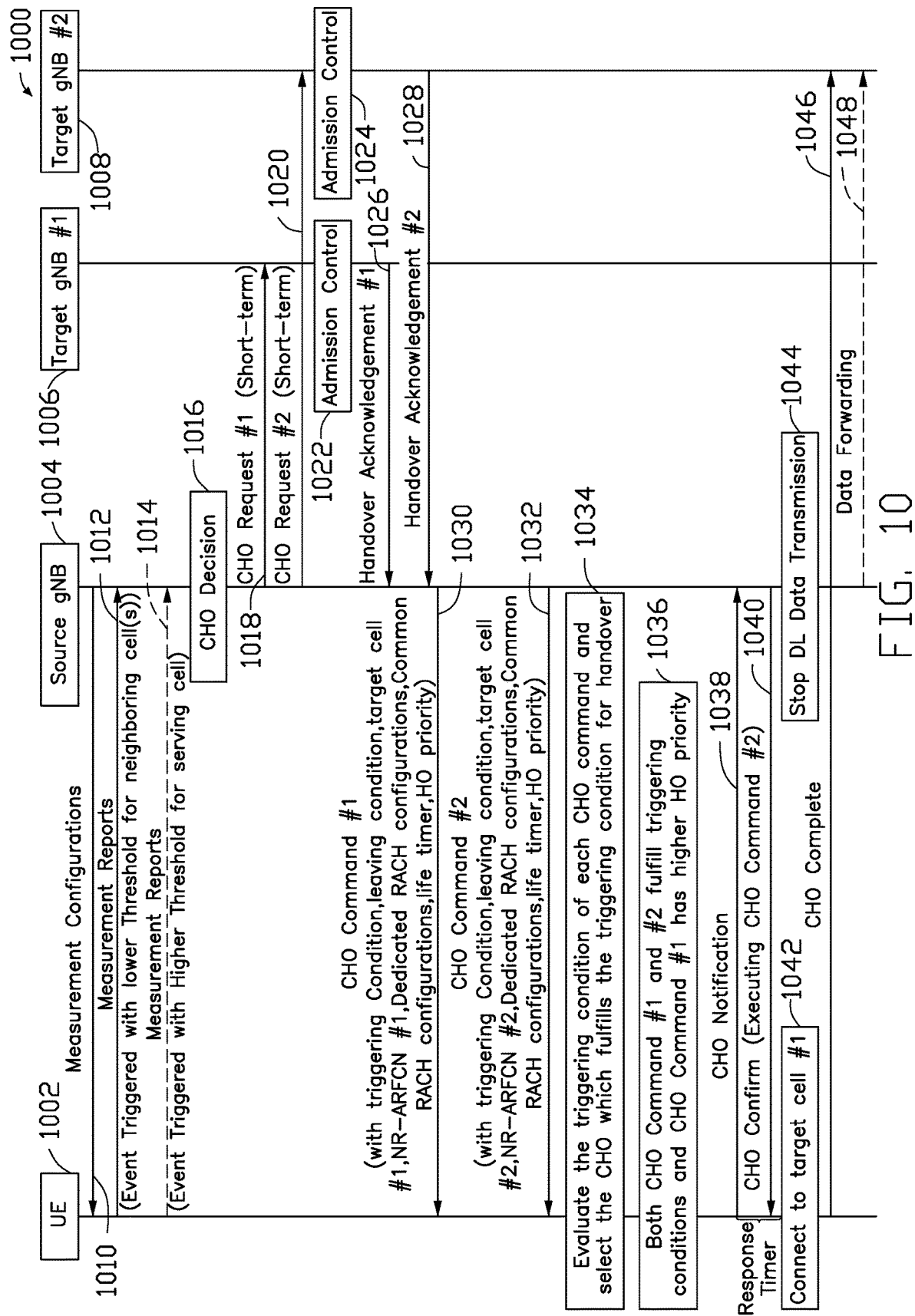
FIG. 10 is a diagram illustrating a CHO procedure having a CHO Notification message for executing one CHO Command, a CHO Confirm message for executing another CHO Command, and a response timer, in accordance with an exemplary implementation of the present application.

Referring to FIG. 10, FIG. 10 is a diagram illustrating a CHO procedure having a CHO Notification message for executing one CHO Command, a CHO Confirm message for executing another CHO Command, and a response timer, in accordance with an exemplary implementation of the present application. Diagram 1000 includes UE 1002, source base station (e.g., gNB) 1004, target base station (e.g., gNB) 1006, and target base station (e.g., gNB) 1008.

As shown in diagram 1000, actions 1010, 1012, 1014, 1016, 1018, 1020, 1022, 1024, 1026, 1028, 1030, 1032, 1034, and 1036 may be substantially similar to actions 910, 912, 914, 916, 918, 920, 922, 924, 926, 928, 930, 932, 934, and 936, respectively, in FIG. 9.

In the present implementation, in action 1038, UE 1002 may send a CHO Notification message to inform source base station 1004 of the information of the triggered CHO Command #1. The CHO Notification message may include a CHO Command ID or the corresponding configuration of CHO Command #1. The CHO Command ID of each CHO Command may be assigned by source base station 1004 and transmitted to UE 1002 as part of the reconfiguration with the corresponding CHO Command.

When UE 1002 sends the CHO Notification message to source base station 1004, a response timer may start. The value of the response timer may be configured by source base station 1004, by the target base station associated with the triggered CHO Command (e.g., target base station 1006), or may be predefined. While the response timer is still running, source base station 1004 may decide whether to allow the execution of the triggered CHO Command.

In contrast to action 940 in FIG. 9, in action 1040 of FIG. 10, source base station 1004 may transmit a CHO Confirm message back to UE 1002, while the response timer is still running, where the CHO Confirm message instructs UE 1002 to use another stored CHO command, such as CHO Command #2. After UE 1002 receives the CHO Confirm message, UE 1002, in action 1042, may execute the triggered CHO command to connect to target cell #2 associated with CHO Command #2, and the response timer may stop.

After sending the CHO Confirm message to UE 1002, source base station 1004 may stop downlink data transmission to UE 1002 in action 1044. In action 1040, UE 1002 may send a CHO Complete message to target base station 1008. Alternatively, UE 1002 may send a CHO Complete message to source base station 1004. After transmitting CHO Confirm message to UE 1002, or receiving a CHO Complete message from UE 1002, source base station 1004 may start data forwarding to target base station 1008 in action 1048. Once the HO is successful, other CHO command(s) stored in UE 1002 may be released.

Figure 11:
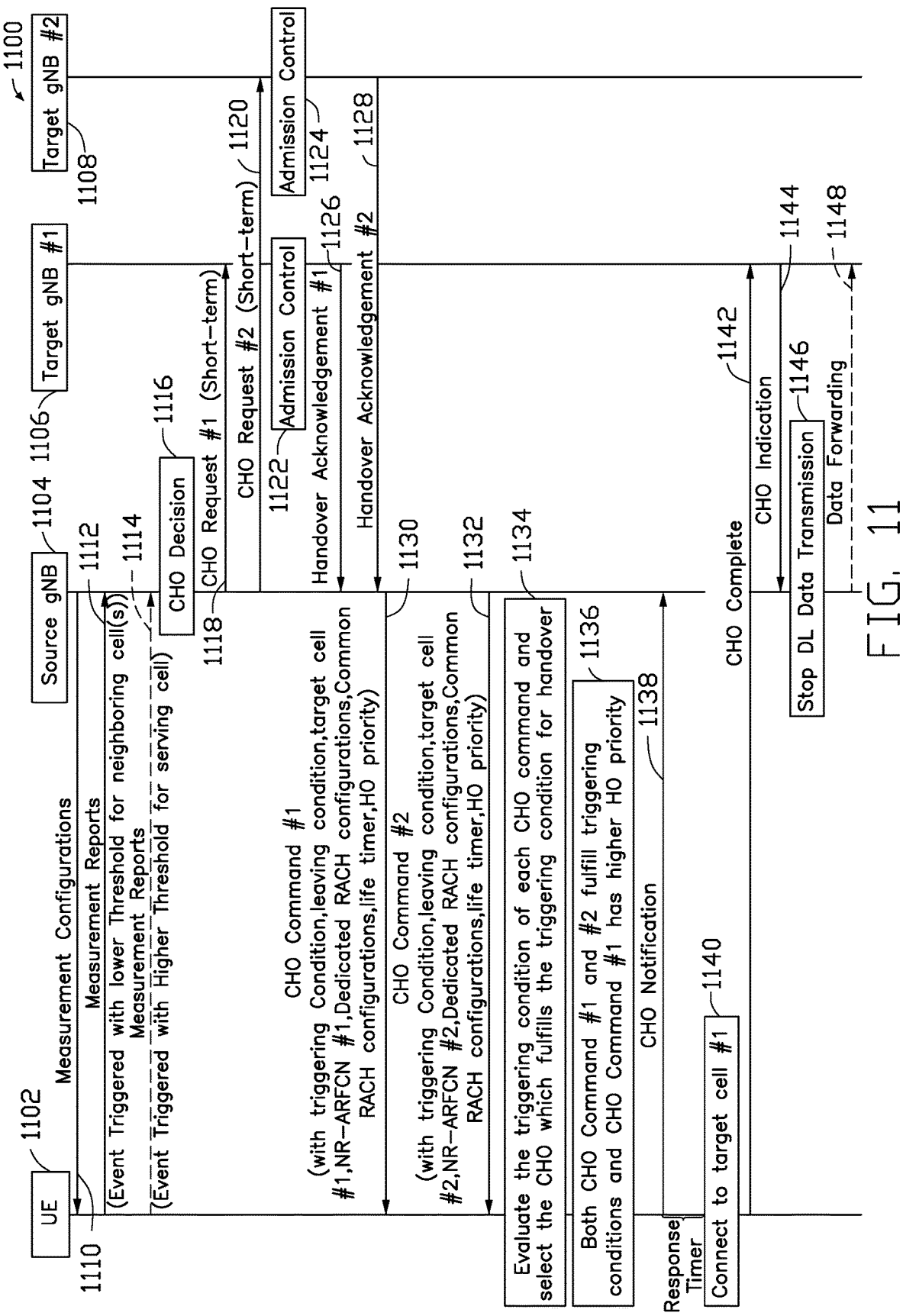
FIG. 11 is a diagram illustrating a CHO procedure having a CHO Notification message for executing one CHO Command, but without a CHO Confirm message, and a response timer, in accordance with an exemplary implementation of the present application.

Referring to FIG. 11, FIG. 11 is a diagram illustrating a CHO procedure having a CHO Notification message for executing one CHO Command, but without a CHO Confirm message, and a response timer, in accordance with an exemplary implementation of the present application. Diagram 1100 includes UE 1102, source base station (e.g., gNB) 1104, target base station (e.g., gNB) 1106, and target base station (e.g., gNB) 1108.

As shown in diagram 1100, actions 1110, 1112, 1114, 1116, 1118, 1120, 1122, 1124, 1126, 1128, 1130, 1132, 1134, and 1136 may be substantially similar to actions 910, 912, 914, 916, 918, 920, 922, 924, 926, 928, 930, 932, 934, and 936, respectively, in FIG. 9.

In the present implementation, in action 1138, UE 1102 may send a CHO Notification message to inform source base station 1104 of the information of the triggered CHO Command #1. The CHO Notification message may include a CHO Command ID or the corresponding configuration of CHO Command #1. The CHO Command ID of each CHO Command may be assigned by source base station 1104 and transmitted to UE 1102 as part of the reconfiguration with the corresponding CHO Command.

When UE 1102 sends the CHO Notification message to source base station 1104, a response timer may start, for example, to wait for network command or instruction. The value of the response timer may be configured by source base station 1104, by the target base station associated with the triggered CHO Command (e.g., target base station 1106), or may be predefined.

In the present implementation, UE 1102 may not receive a CHO Confirm message or other command or instruction from source base station 1104 before the response timer expires. As such, UE 902 may assume that the serving cell quality has become worse such that either the transmission of CHO notification message (which is protected by ARQ and HARQ) to source base station 904 has failed or the transmission of CHO Confirm message to UE 902 has failed. Upon expiration of the response timer, UE 1102 may execute the triggered CHO command (e.g., CHO Command #1), and connect to target cell #1 associated with CHO Command #1, in action 1140.

After receiving a CHO Complete message from UE 1102, in action 1142, target base station 1106 may determine that the HO is successful, and may send a CHO indication message to source base station 1104, in action 1144. Upon receiving the CHO indication message, source base station 1104 may stop downlink data transmission to UE 1102 in action 1146, and start data forwarding to target base station 1106 in action 1148. Source base station 1104 may also release other CHO command(s) information of other target candidate base stations (e.g. target base station 1108) and may send a notification to other target candidate base station e.g., while the corresponding life timer of the corresponding CHO command provided to the UE has not expired.

Figure 12:
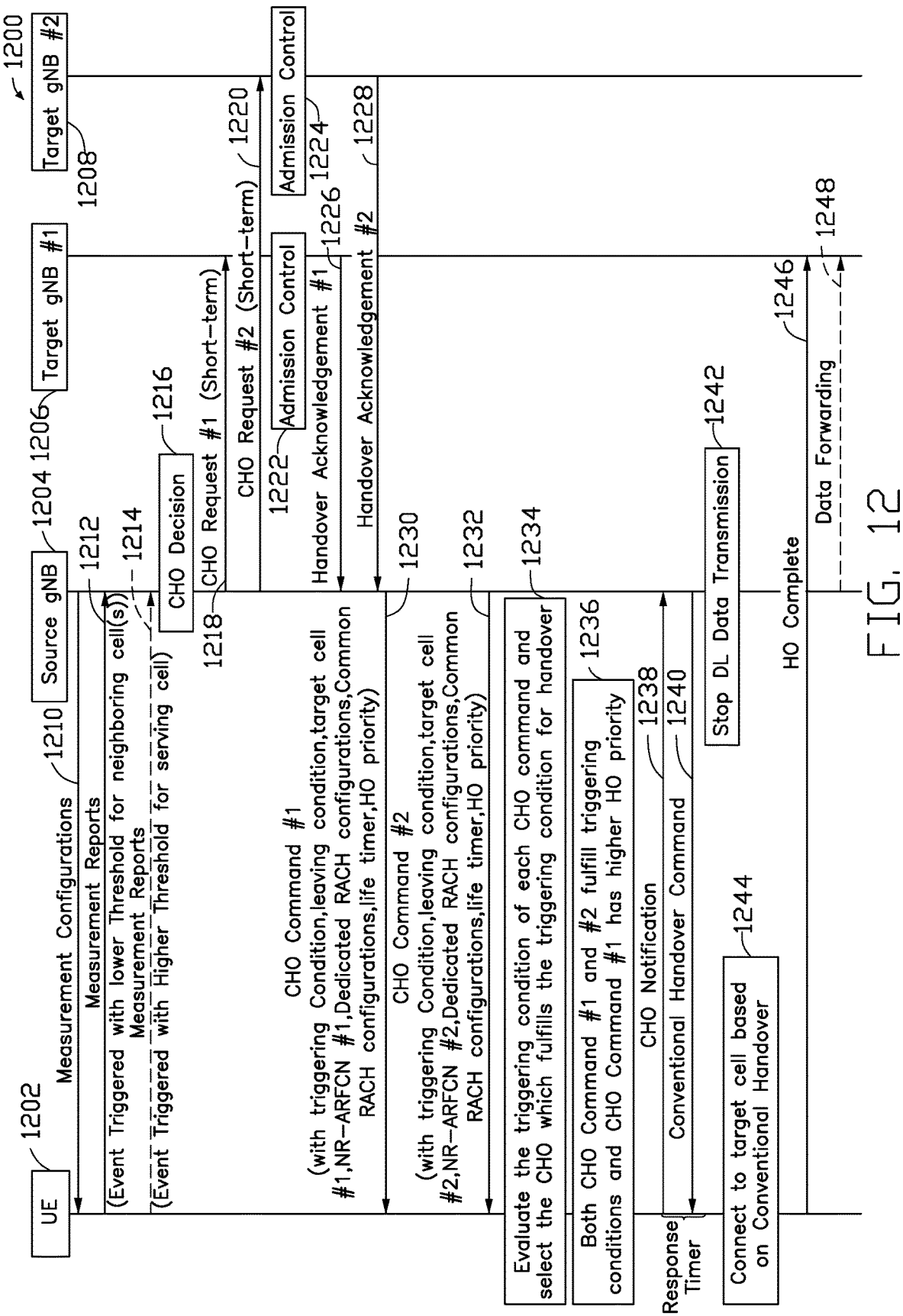
FIG. 12 is a diagram illustrating a CHO procedure followed by a conventional HO procedure, without a conventional HO command, a CHO Notification, and a response timer, in accordance with an exemplary implementation of the present application.

Referring to FIG. 12, FIG. 12 is a diagram illustrating a CHO procedure followed by a conventional HO procedure, a conventional HO command, a CHO Notification, and a response timer, in accordance with an exemplary implementation of the present application. Diagram 1200 includes UE 1202, source base station (e.g., gNB) 1204, target base station (e.g., gNB) 1206, and target base station (e.g., gNB) 1208.

As shown in diagram 1200, actions 1210, 1212, 1214, 1216, 1218, 1220, 1222, 1224, 1226, 1228, 1230, 1232, 1234, and 1236 may be substantially similar to actions 910, 912, 914, 916, 918, 920, 922, 924, 926, 928, 930, 932, 934, and 936, respectively, in FIG. 9.

In the present implementation, in action 1238, UE 1202 may send a CHO Notification message to inform source base station 1204 of the information of the triggered CHO Command #1. The CHO Notification message may include a CHO Command ID or the corresponding configuration of CHO Command #1. The CHO Command ID of each CHO Command may be assigned by source base station 1204 and transmitted to UE 1202 as part of the reconfiguration with the corresponding CHO Command.

When UE 1202 sends the CHO Notification message to source base station 1204, a response timer may start, for example, to wait for network command or instruction. The value of the response timer may be configured by source base station 1204, by the target base station associated with the triggered CHO Command (e.g., target base station 1206), or predefined. While the response timer is still running, source base station 1204 may transmit a conventional Handover Command message to UE 1202, in action 1240.

After receiving the conventional Handover Command message from source base station 1204, the waiting for the execution of CHO command #1 is suspended, and instead, UE 1202 may execute the received conventional Handover Command from source base station 1204. As shown in action 1244, UE 1202 may connect to target cell based on the conventional Handover Command.

In action 1246, UE 1202 may send an HO Complete message (i.e., for the Conventional Handover Command) to target base station 1206. Alternatively, UE 1202 may send a CHO Complete message to source base station 1204. After transmitting Conventional Handover Command to UE 1202, source base station 1204 may start data forwarding to target base station 1206 in action 1248.

It should be noted that, in the present implementation shown in FIG. 12, the target base station selected, by source base station 1204, for the conventional Handover procedure, in action 1240, is target base station 1206, which happens to be the same as the selected target base station based on the triggered CHO commands. In another implementation, the target base station selected for the conventional Handover procedure may be different from the selected target base station based on the triggered CHO commands.

Figure 13:
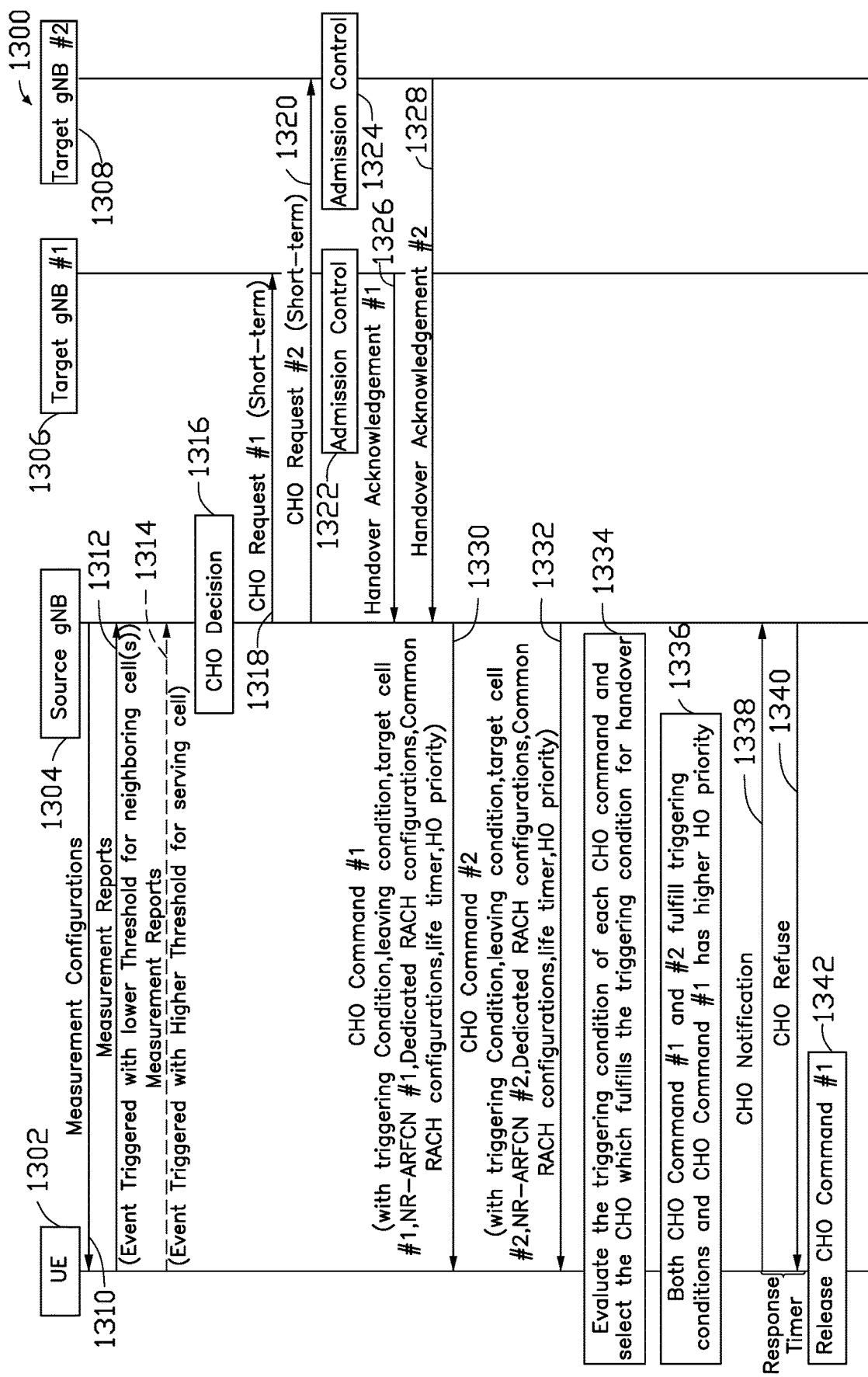
FIG. 13 is a diagram illustrating a CHO procedure having a CHO Notification message for executing one CHO Command, a CHO Refuse message, and a response timer, in accordance with an exemplary implementation of the present application.

Referring to FIG. 13, FIG. 13 is a diagram illustrating a CHO procedure having a CHO Notification message for executing one CHO Command, a CHO Refuse message, and a response timer, in accordance with an exemplary implementation of the present application. Diagram 1300 includes UE 1302, source base station (e.g., gNB) 1304, target base station (e.g., gNB) 1306, and target base station (e.g., gNB) 1308.

As shown in diagram 1300, actions 1310, 1312, 1314, 1316, 1318, 1320, 1322, 1324, 1326, 1328, 1330, 1332, 1334, and 1336 may be substantially similar to actions 910, 912, 914, 916, 918, 920, 922, 924, 926, 928, 930, 932, 934, and 936, respectively, in FIG. 9.

In the present implementation, in action 1338, UE 1302 may send a CHO Notification message to inform source base station 1304 of the information of a triggered CHO Command (e.g., CHO Command #1). The CHO Notification message may include a CHO Command ID or the corresponding configuration of CHO Command #1. The CHO Command ID of each CHO Command may be assigned by source base station 1304 and transmitted to UE 1302 as part of the reconfiguration with the corresponding CHO Command.

When UE 1302 sends the CHO Notification message to source base station 1304, a response timer may start. The value of the response timer may be configured by source base station 1304 or target base station 1306/1308, or predefined. While the response timer is still running, source base station 1304 may decide whether to allow the execution of the triggered CHO Command. Source base station 1304 may decide to refuse the execution of the triggered CHO Command by sending a CHO Refuse message to UE 1302, in action 1340, while the response timer is still running.

When UE 1302 receives the CHO Refuse message in response to the CHO Notification message, the triggered CHO Command related to the CHO notification message may be released, in action 1342. If there is another triggered CHO command, UE 1302 may send a new CHO Notification message in response to the other triggered CHO Command to the Source base station 1304. In this case, the response timer may keep running until it expires, or may restart when the other triggered CHO command is sent.

In another implementation, if UE 1302 receives a CHO Refuse Command, UE 1302 may release all the stored CHO Commands since the network may want to prohibit/prevent the entire CHO procedure.

In another implementation, if UE 1302 receives a CHO Refuse Command, UE 1302 may suspend all the stored CHO commands for a period of time which may be indicated in the CHO Refuse Command.

Figure 14:
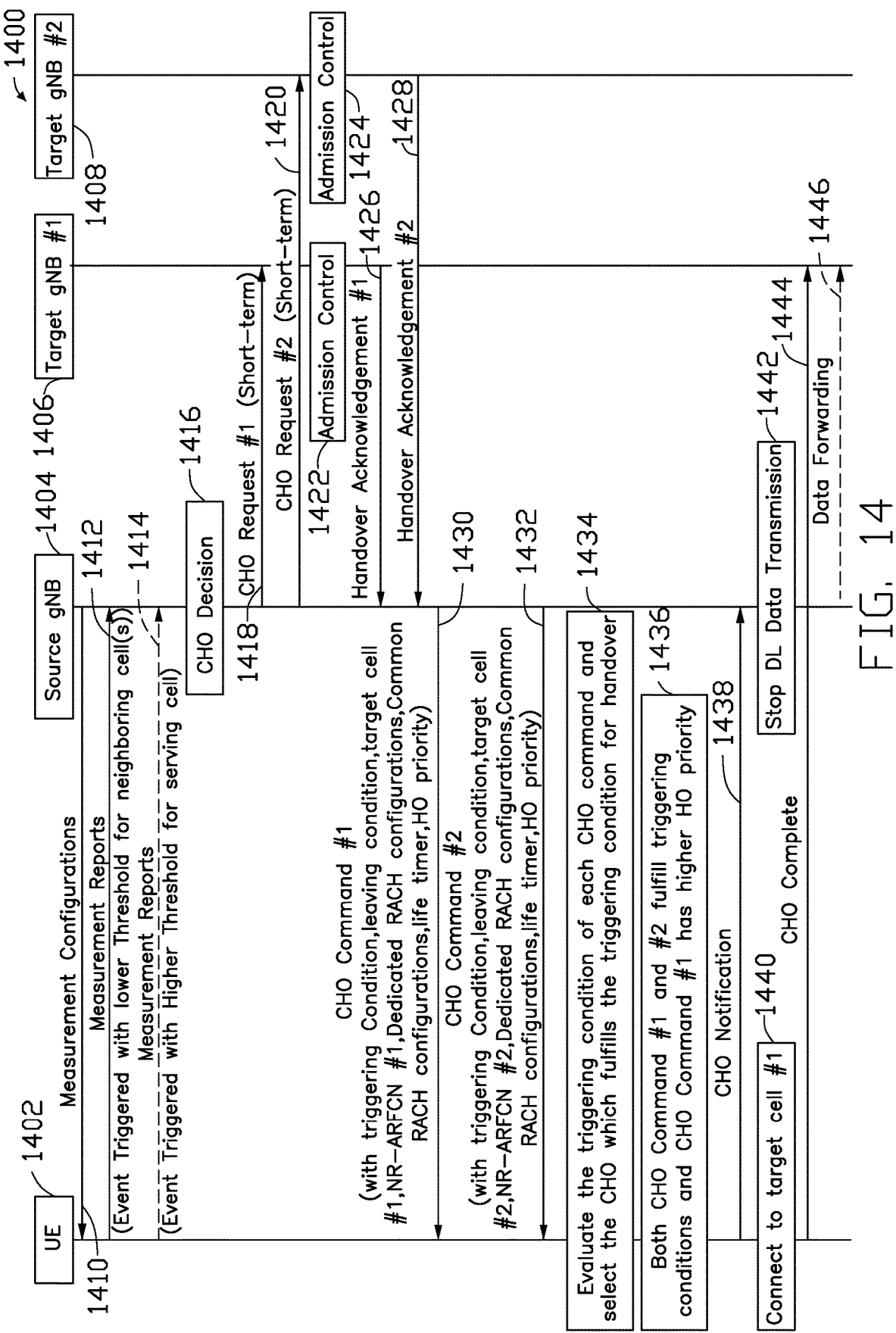
FIG. 14 is a diagram illustrating a CHO procedure having a CHO Notification message for executing one CHO Command, and without a response timer, in accordance with an exemplary implementation of the present application.

Referring to FIG. 14, FIG. 14 is a diagram illustrating a CHO procedure having a CHO Notification message for executing one CHO Command, and without a response timer, in accordance with an exemplary implementation of the present application. Diagram 1400 includes UE 1402, source base station (e.g., gNB) 1404, target base station (e.g., gNB) 1406, and target base station (e.g., gNB) 1408.

As shown in diagram 1400, actions 1410, 1412, 1414, 1416, 1418, 1420, 1422, 1424, 1426, 1428, 1430, 1432, 1434, and 1436 may be substantially similar to actions 910, 912, 914, 916, 918, 920, 922, 924, 926, 928, 930, 932, 934, and 936, respectively, in FIG. 9.

In action 1438, UE 1402 may send a CHO Notification message to inform source base station 1404 of the information of the triggered CHO Command #1. The CHO Notification message may include a CHO Command ID or the corresponding configuration of CHO Command #1. The CHO Command ID of each CHO Command may be assigned by source base station 1404 and transmitted to UE 1402 as part of the reconfiguration with the corresponding CHO Command.

After UE 1402 sends the CHO Notification message to source base station 1404, UE 1402 may execute the triggered CHO Command #1 without waiting for commands or instructions from the network or source base station 1404. In some of the present embodiments, UE 1402 may first execute the triggered CHO Command #1, and then send the CHO notification message to source base station 1404. On the other hand, when source base station 1404 receives the CHO Notification command from UE 1402, source base station 1404 may prepare for HO with target base station 1406 corresponding to CHO Command #1.

In this implementation, there may be no response timer when the CHO Notification message is sent. In action 1440, UE 1402 may execute the triggered CHO Command #1 to connect to target base station 1406 in target cell #1, after sending the CHO Notification message. Thereafter, in action 1444, UE 1402 may send a CHO Complete message to target base station 1406.

When source base station 1404 successfully receives the CHO Notification message containing the information of triggered CHO Command (e.g., CHO command ID or the corresponding configuration), source base station 1404 may stop downlink data transmission to UE 1402 in action 1442 (if the CHO Command does not configure the make-before-break feature). Also, in action 1446, source base station 1404 may start data forwarding to target base station 1406. Once the HO procedure is successful, other CHO command(s) stored in UE 1402 may be released.

Figure 15:
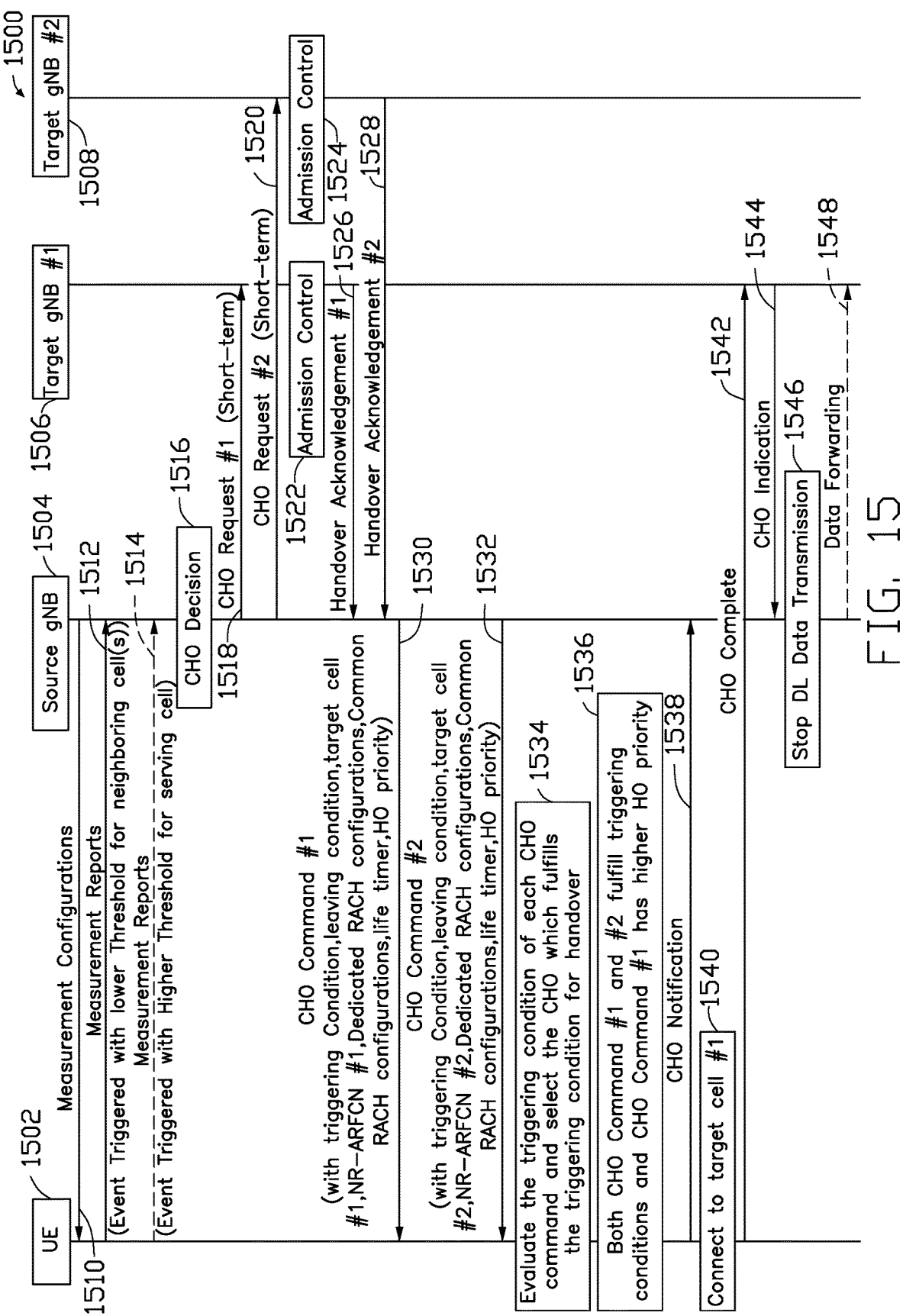
FIG. 15 is a diagram illustrating a CHO procedure having an unsuccessful CHO Notification message delivery, and without a response timer, in accordance with an exemplary implementation of the present application.

Referring to FIG. 15, FIG. 15 is a diagram illustrating a CHO procedure having an unsuccessful CHO Notification message delivery, and without a response timer, in accordance with an exemplary implementation of the present application. Diagram 1500 includes UE 1502, source base station (e.g., gNB) 1504, target base station (e.g., gNB) 1506, and target base station (e.g., gNB) 1508.

As shown in diagram 1500, actions 1510, 1512, 1514, 1516, 1518, 1520, 1522, 1524, 1526, 1528, 1530, 1532, 1534, and 1536 may be substantially similar to actions 1410, 1412, 1414, 1416, 1418, 1420, 1422, 1424, 1426, 1428, 1430, 1432, 1434, and 1436, respectively, in FIG. 14.

In action 1538, UE 1502 may send a CHO Notification message to inform source base station 1504 of the information of the triggered CHO Command #1. The CHO Notification message may include a CHO Command ID or the corresponding configuration of CHO Command #1. The CHO Command ID of each CHO Command may be assigned by source base station 1504 and transmitted to UE 1502 as part of the reconfiguration with the corresponding CHO Command.

However, the CHO Notification message may not be received by source base station 1504. As a result, source base station 1504, not knowing CHO Command #1 was triggered, may not prepare for HO with target base station 1506 corresponding to CHO Command #1.

After UE 1502 sends the CHO Notification message to source base station 1504, UE 1502 may execute the triggered CHO Command #1 without waiting for commands or instructions from the network or source base station 1504.

In this implementation, there may be no response timer when the CHO Notification message is sent. In action 1540, UE 1502 may execute the triggered CHO Command #1 to connect to target base station 1506 in target cell #1, after sending the CHO Notification message. Thereafter, in action 1542, UE 1502 may send a CHO Complete message to target base station 1506. As described above, in some of the present embodiments, UE 1502 may first execute the triggered CHO Command #1 (e.g., to connect to target cell #1 of target base station 1506), and then send the CHO Notification message (e.g., to source base station 1504).

After receiving the CHO Complete message from UE 1502, target base station 1506 may determine that the HO is successful. Thereafter, in action 1544, target base station 1506 may send a CHO indication message to source base station 1504. Upon receiving the CHO indication message, source base station 1504 may stop downlink data transmission to UE 1502 in action 1546, and start data forwarding to target base station 1506 in action 1548. Once the HO procedure is successful, other CHO command(s) stored in UE 1502 may be released.

Figure 16:
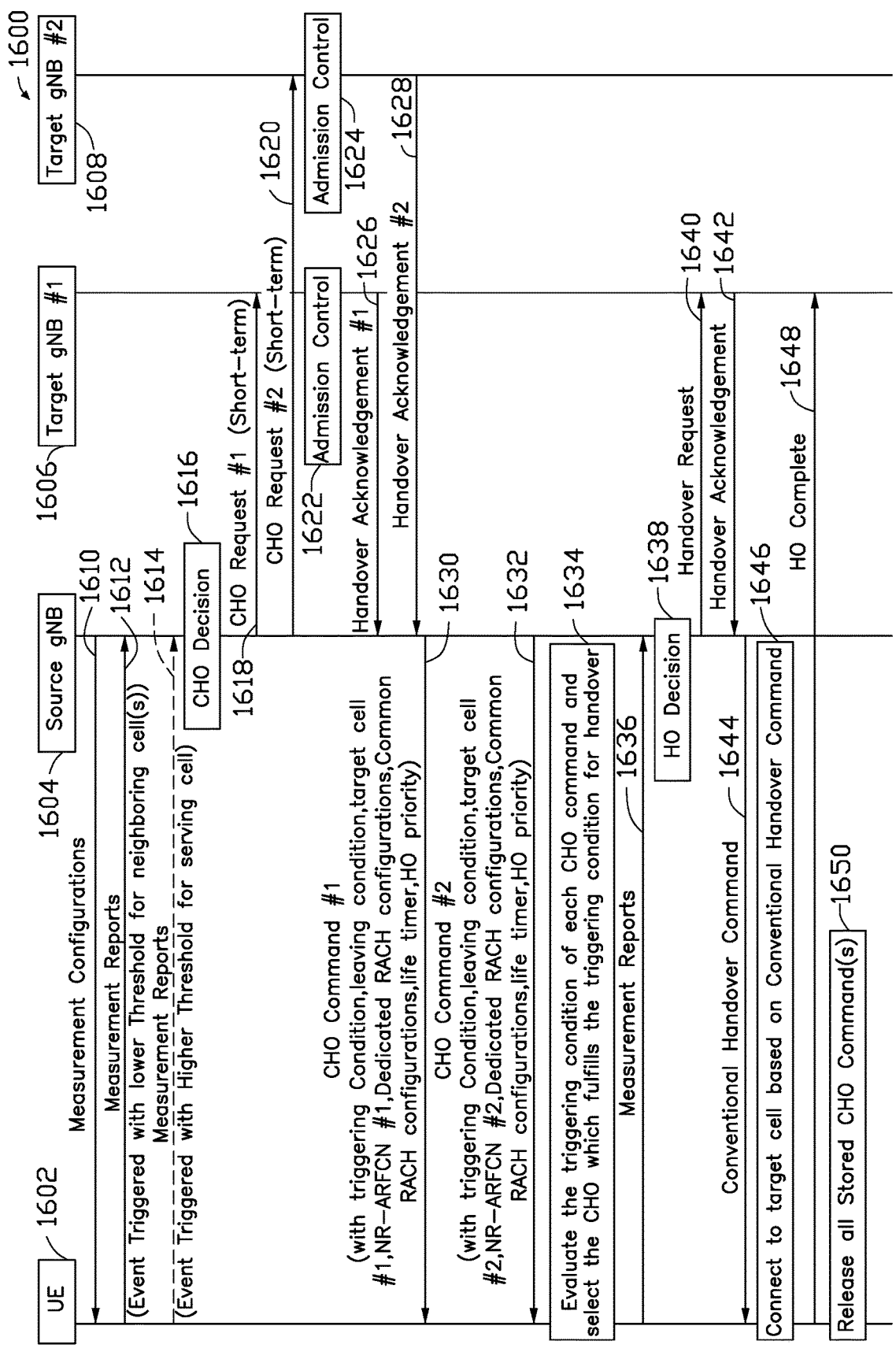
FIG. 16 is a diagram illustrating a CHO procedure followed by a conventional HO procedure, without a CHO Notification and without a conflict with a triggered CHO Command, in accordance with an exemplary implementation of the present application.

Referring to FIG. 16, FIG. 16 is a diagram illustrating a CHO procedure followed by a conventional HO procedure, without a CHO Notification and without a conflict with a triggered CHO Command, in accordance with an exemplary implementation of the present application. Diagram 1600 includes UE 1602, source base station (e.g., gNB) 1604, target base station (e.g., gNB) 1606, and target base station (e.g., gNB) 1608.

As shown in diagram 1600, actions 1610, 1612, 1614, 1616, 1618, 1620, 1622, 1624, 1626, 1628, 1630, 1632, and 1634 may be substantially similar to actions 910, 912, 914, 916, 918, 920, 922, 924, 926, 928, 930, 932, and 934, respectively, in FIG. 9.

In the present implementation, although UE 1602 stores CHO command(s), source base station 1604 may still transmit a conventional Handover Command message to UE 1602 for HO. As shown in action 1636, UE 1602 may send measurement reports to source base station 1604. In action 1638, source base station 1604 may make an HO decision to initiate an HO procedure with target base station 1606. Thereafter, in actions 1640, 1642, 1644, and 1646, a conventional HO procedure is performed.

In the present implementation, there may not be any triggered CHO Command before UE 1602 receives the conventional Handover Command message in action 1644. Thus, UE 1602 may execute the conventional Handover Command message to connect to the target cell indicated in the conventional Handover Command message in action 1646. When the HO procedure is successful, UE 1602 may transmit an HO Complete message to target base station 1606 in action 1648. Thereafter, in action 1650, all the stored CHO command(s) in UE 1602 may be released as shown in FIG. 16.

Figure 17:
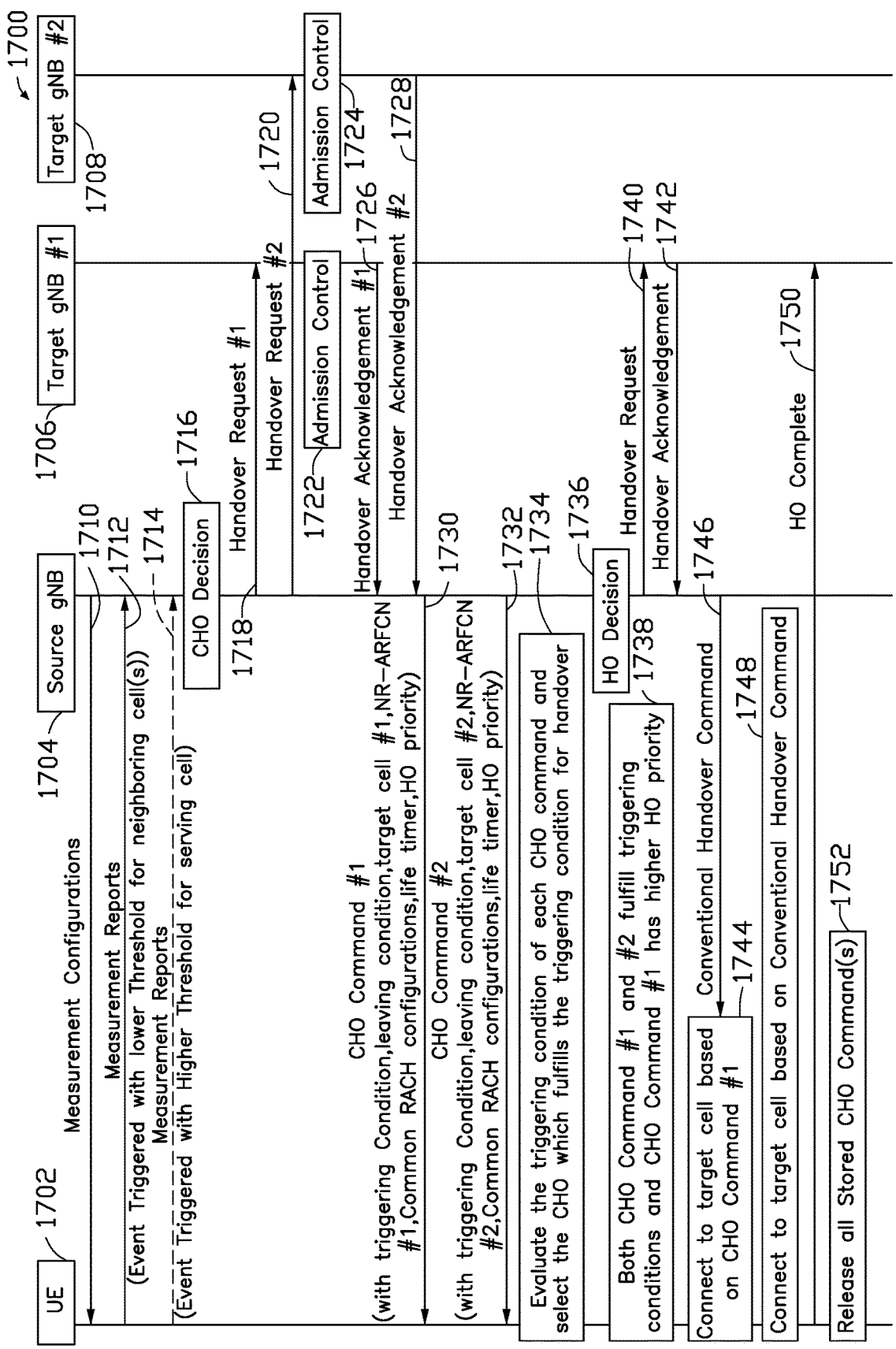
FIG. 17 is a diagram illustrating a CHO procedure followed by a conventional HO procedure, without a CHO Notification, and with a conflict with a triggered CHO Command, in accordance with an exemplary implementation of the present application.

Referring to FIG. 17, FIG. 17 is a diagram illustrating a CHO procedure followed by a conventional HO procedure, without a CHO Notification, and with a conflict with a triggered CHO Command, in accordance with an exemplary implementation of the present application. Diagram 1700 includes UE 1702, source base station (e.g., gNB) 1704, target base station (e.g., gNB) 1706, and target base station (e.g., gNB) 1708.

As shown in diagram 1700, actions 1710, 1712, 1714, 1716, 1718, 1720, 1722, 1724, 1726, 1728, 1730, 1732, and 1734 may be substantially similar to actions 910, 912, 914, 916, 918, 920, 922, 924, 926, 928, 930, 932, and 934, respectively, in FIG. 9.

In the present implementation, although UE 1702 stores CHO command(s), source base station 1704 may still transmit a conventional Handover Command message to UE 1702 for HO. As shown in action 1736, source base station 1704 may make an HO decision to initiate an HO procedure with target base station 1706. Thereafter, in actions 1740 and 1742, source base station 1704 may send Handover Request to, and receive a Handover Acknowledgement from, target base station 1706, respectively.

In the present application, in action 1738, UE 1702 may determine that both CHO Commands #1 and #2 fulfill their triggering conditions, and CHO Command #1 has a higher HO priority than CHO Command #2. In the present implementation, UE 1702 may not send a CHO Notification to source base station 1704, and instead, may initiate a connecting to target base station 1706 associated with CHO Command #1.

While UE 1702 executes action 1744, UE 1702 may receive a conventional Handover Command from source base station 1704 in action 1746. That is, while UE 1702 is executing the triggered CHO command, for example, using dedicated or common RACH resources for a random access procedure in action 1744, UE 1702 may also receive the conventional Handover Command message from source base station 1704 in action 1746. Because the conventional Handover Command message is based on the latest measurement reports with the latest radio configurations, in the present implementation, UE 1702 may suspend the ongoing triggered CHO Command, and may instead, execute the received conventional Handover Command.

In one implementation, if the triggered CHO Command does configure the make-before-break feature, since UE 1702 does not complete the overall HO procedure to connect to target base station 1706 in target cell #1 in response to CHO Command #1, the execution of the CHO Command #1 may be suspended and the received conventional Handover Command may be executed instead. That is, UE 1702 may start executing the received conventional Handover Command. After the HO procedure is successful, all the stored CHO command(s) in UE 1702 may be released as shown in 1752.

In another implementation, if the CHO command does not configure the make-before-break feature, since UE 1702 may break the connection to source base station 1704, and perform random access procedure to target base station 1706, UE 1702 may not be able to receive the conventional Handover Command message. In such a case, UE 1702 may execute the triggered CHO Command without the effect of the conventional Handover command.

It should be noted that, in the present implementation shown in FIG. 17, the target base station decided by the conventional HO decision in action 1736, is target base station 1706, which happens to be the same as the selected target base station based on the triggered CHO commands. In another implementation, the target base station selected by the conventional HO decision may be different from the selected target base station based on the triggered CHO commands.

Figure 18:
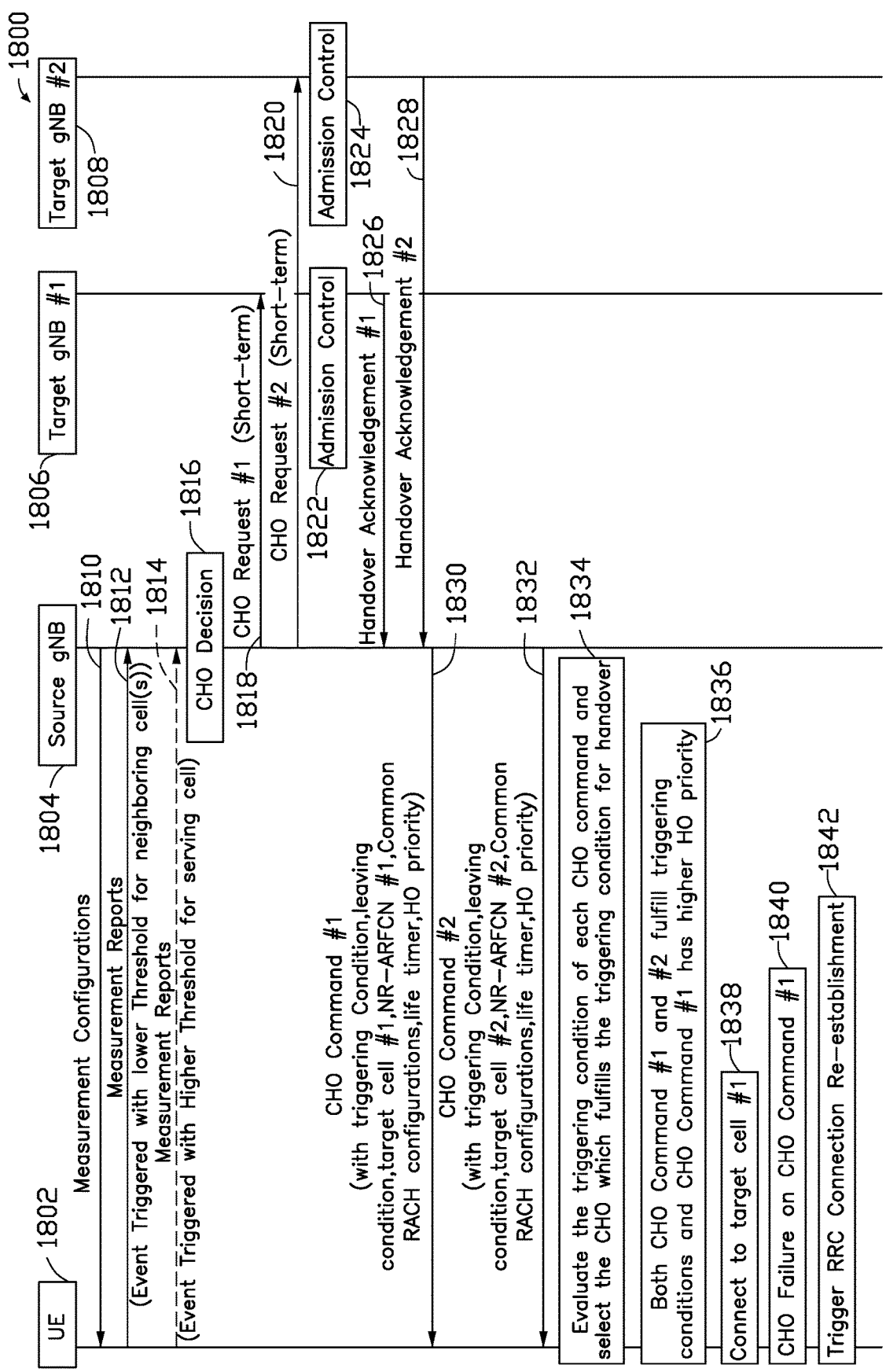
FIG. 18 is a diagram illustrating a CHO failure response procedure via an RRC Connection Re-establishment, in accordance with an exemplary implementation of the present application.
Figure 19:
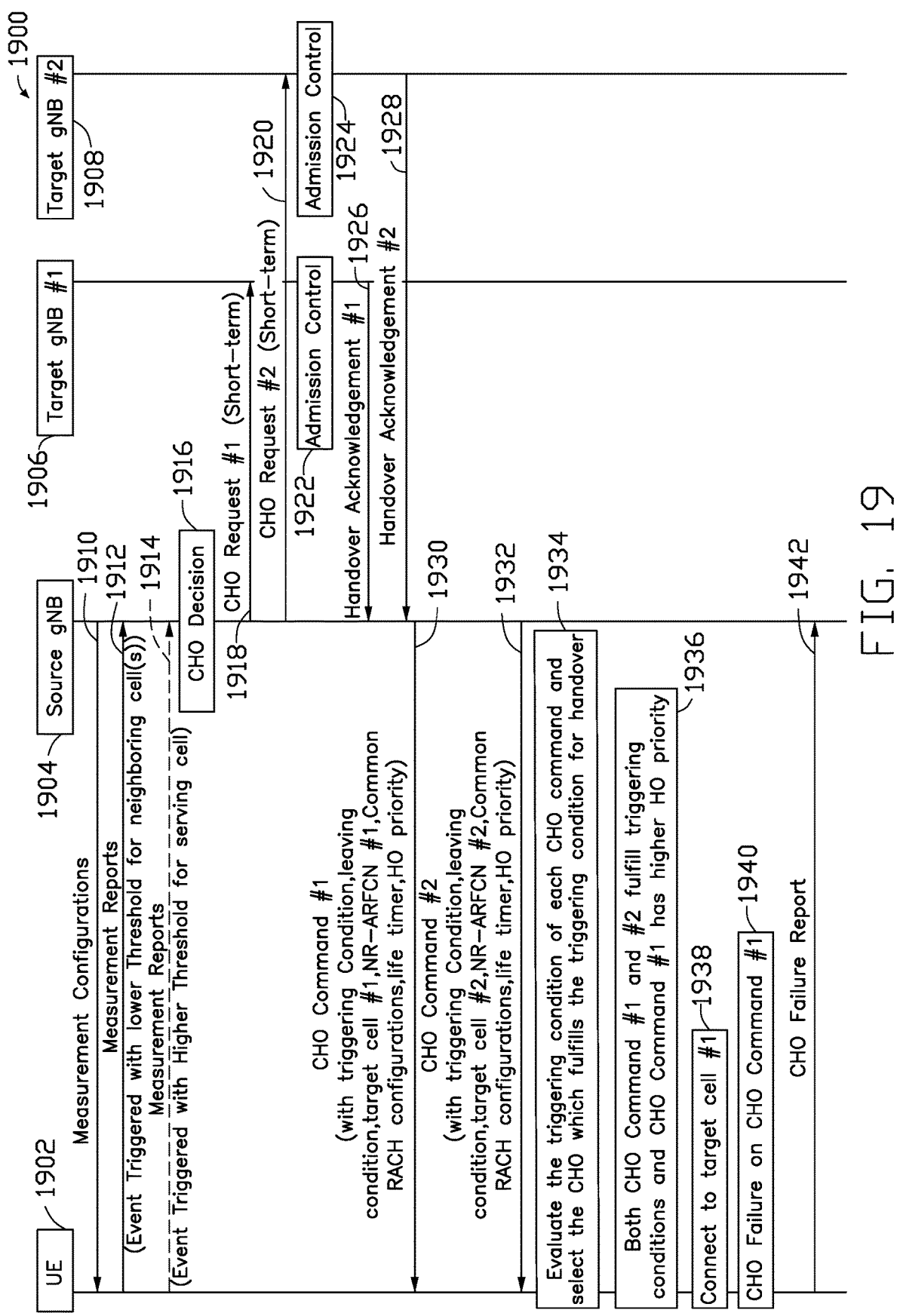
FIG. 19 is a diagram illustrating a CHO failure response procedure by sending a CHO Failure Report, in accordance with an exemplary implementation of the present application.
Figure 20:
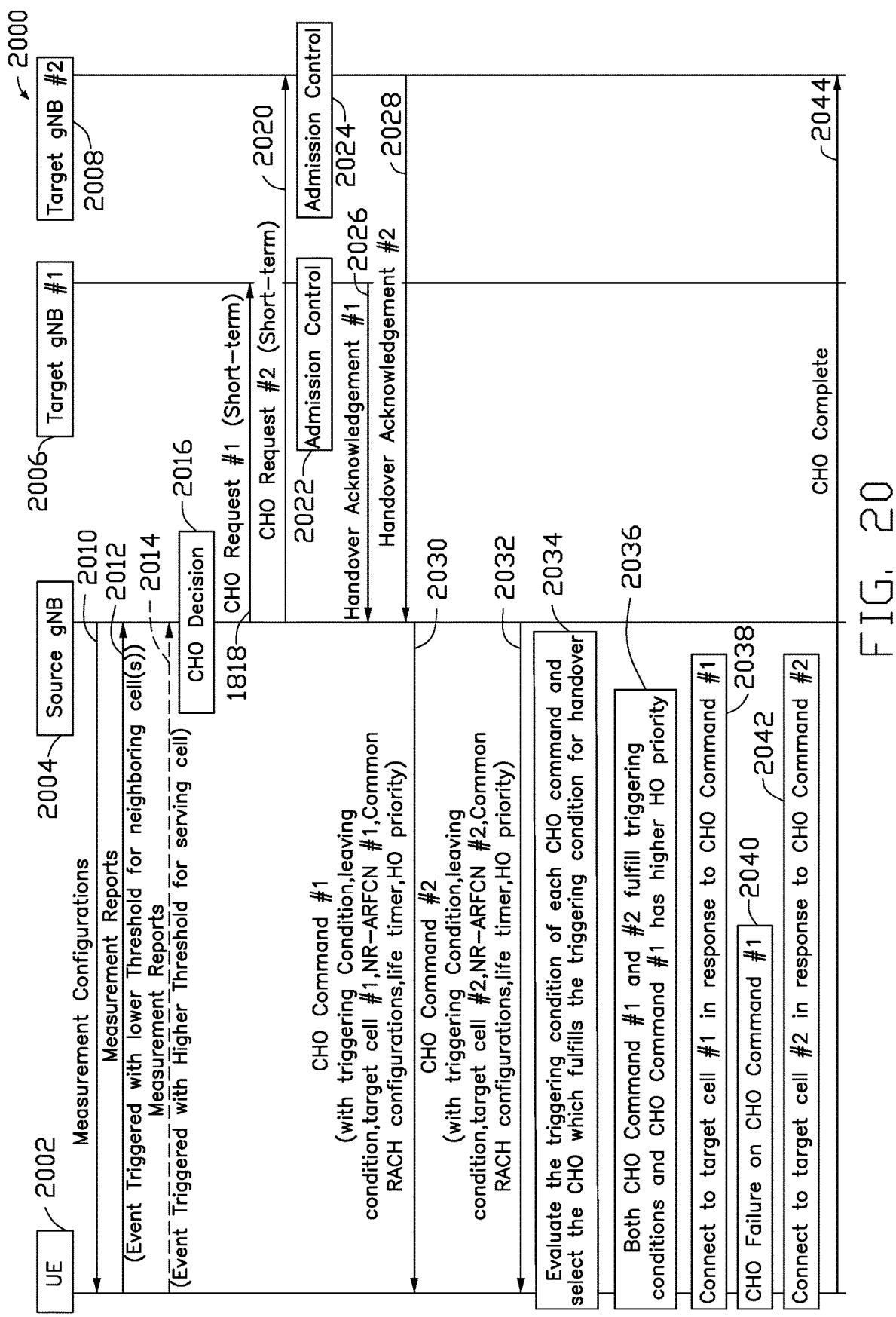
FIG. 20 is a diagram illustrating a CHO failure response procedure by trying another triggered CHO Command, in accordance with an exemplary implementation of the present application.

The following implementations, in FIGS. 18, 19, and 20, show exemplary CHO failure response procedures to prevent and/or avoid undefined/unpredictable UE behaviors. In one implementation, in response to a CHO failure, a UE may directly perform an RRC Connection Re-establishment procedure. In another implementation, in response to a CHO failure, a UE may attempt to select another triggered CHO Command (if there is another CHO Command also fulfills its triggering condition). In another implementation, in response to a CHO failure, a UE may wait for the source base station's response by sending a CHO Failure Report.

Referring to FIG. 18, FIG. 18 is a diagram illustrating an exemplary CHO failure response procedure via an RRC Connection Re-establishment, in accordance with an exemplary implementation of the present application. In the present implementation, when the CHO procedure based on the triggered CHO Command fails, the UE may trigger an RRC Connection Re-establishment procedure.

As shown in FIG. 18, diagram 1800 includes UE 1802, source base station (e.g., gNB) 1804, target base station (e.g., gNB) 1806, and target base station (e.g., gNB) 1808. As shown in diagram 1800, actions 1810, 1812, 1814, 1816, 1818, 1820, 1822, 1824, 1826, 1828, 1830, 1832, 1834, and 1836 may be substantially similar to actions 910, 912, 914, 916, 918, 920, 922, 924, 926, 928, 930, 932, 934, and 936, respectively, in FIG. 9.

As shown in FIG. 18, UE 1802 may execute CHO Command #1 (which has the highest HO priority) in action 1838. However, the CHO procedure may fail in action 1840, for example, due to a failed random access procedure or an expiration of a CHO execution timer. For example, the CHO execution timer may be similar to time T304 in an LTE network, which is configured in the CHO command message. Once the CHO failure happens, in action 1840, UE 1802 may trigger an RRC Connection Re-establishment procedure to resume the RRC connection in action 1842. To perform the RRC Connection Reestablishment procedure, UE 1802 may select a suitable cell to transmit an RRCConnectionReestablishmentRequest message, based on a predefined suitable cell criteria (e.g., signal strength or quality criteria), and may be part of the allowed public land mobile network (PLMN) (e.g., the Non-access stratum (NAS) selected, the registered PLMN, or a PLMN of the Equivalent PLMN list). Also, the suitable cell may not be barred and may not belong to a tracking area of the list of forbidden tracking areas for roaming. In some implementations, once the CHO failure happens and the UE triggers an RRC Connection Re-establishment procedure, the UE may set the re-establishment cause as CHO failure in the RRC re-establishment request message.

In another implementation, the target cell of each CHO Command for UE 1802 may be considered as a suitable cell for an RRC Connection Reestablishment while these target cells fulfill the definition of a suitable cell mentioned above. An HO priority parameter may be given to each CHO Command for the associated target cell. When selecting a suitable cell for an RRC Connection Reestablishment, the HO priority may be considered as part of the suitable cell criteria. Specifically, among all the suitable cells for RRC Connection Reestablishment, UE 1802 may first select the suitable cell with the highest HO priority. If there is a suitable cell without an HO priority (e.g., a cell is not the target cell of a CHO command or the associated CHO command is not assigned an HO priority), the HO priority of the cell may be set to a default priority.

Referring to FIG. 19, FIG. 19 is a diagram illustrating an exemplary CHO failure response procedure by sending a CHO Failure Report, in accordance with an exemplary implementation of the present application. In the present implementation, when the CHO procedure based on the triggered CHO Command fails, the UE may send a CHO Failure Report to inform the source base station, and the source base station may take the actions, such as initiating a Handover procedure. Also, the triggered CHO command may be released accordingly.

As shown in FIG. 19, diagram 1900 includes UE 1902, source base station (e.g., gNB) 1904, target base station (e.g., gNB) 1906, and target base station (e.g., gNB) 1908. As shown in diagram 1900, actions 1910, 1912, 1914, 1916, 1918, 1920, 1922, 1924, 1926, 1928, 1930, 1932, 1934, and 1936 may be substantially similar to actions 910, 912, 914, 916, 918, 920, 922, 924, 926, 928, 930, 932, 934, and 936, respectively, in FIG. 9.

As shown in FIG. 19, UE 1902 may execute CHO Command #1 (which has the highest HO priority) in action 1938. However, the CHO procedure may fail in action 1940, for example, due to a failed random access procedure or an expiration of a CHO execution timer (e.g., T304-like timer).

When the CHO failure happens, UE 1902 may sends a CHO Failure Report to inform source base station 1904. The CHO Failure Report content may include the ID of failed CHO Command, the configuration related to the failed CHO Command, the cause of CHO failure, the failed target cell ID, the failed target base station ID, and/or the latest measurement results. Based on the CHO Failure Report, source base station 1904 may decide the next appropriate action for UE 1902. In one implementation, source base station 1904 may decide to start a conventional HO procedure. In one implementation, source base station 1904 may instruct the UE to select another triggered CHO Command (e.g., CHO Command #2). In one implementation, source base station 1904 may select another CHO Command for UE 1902 to perform a CHO procedure.

In one implementation of the present application, if the UE does not receive any response from the source base station within a configured time or a predefined time, or upon detecting a radio link failure problem, the UE may perform an RRC Connection Re-establishment procedure (e.g., the security is activated) or enter to an IDLE mode (e.g., the security is not activated).

Referring to FIG. 20, FIG. 20 is a diagram illustrating an exemplary CHO failure response procedure by trying another triggered CHO Command, in accordance with an exemplary implementation of the present application. In the present implementation, when the CHO procedure based on the triggered CHO Command fails, the UE may execute another triggered CHO Command (if there is at least one triggered CHO Command pending). If there is no more triggered CHO Command to execute, the UE may trigger an RRC Connection Re-establishment procedure to resume the RRC connection (as shown in FIG. 18) or send a CHO Failure Report to the source base station for next action (as shown in FIG. 19). Different CHO failure response procedures may be configured to be used in combination with one another.

As shown in FIG. 20, diagram 2000 includes UE 2002, source base station (e.g., gNB) 2004, target base station (e.g., gNB) 2006, and target base station (e.g., gNB) 2008. As shown in diagram 2000, actions 2010, 2012, 2014, 2016, 2018, 2020, 2022, 2024, 2026, 2028, 2030, 2032, 2034, and 2036 may be substantially similar to actions 910, 912, 914, 916, 918, 920, 922, 924, 926, 928, 930, 932, 934, and 936, respectively, in FIG. 9.

As shown in FIG. 20, UE 2002 may execute the CHO command #1 (which has the highest HO priority) in action 2038. However, the CHO procedure fails in action 2040, for example, due to a failed random access procedure or an expiration of a CHO execution timer (e.g., T304-like timer). However, there is another triggered CHO command #2 pending. Thus, in the present implementation, UE 2002 may execute CHO command #2 (which has the next highest HO priority), and attempt to connect to target base station 2008 in target cell #2. If the HO procedure to target cell #2 is successful, other CHO command(s) stored in UE 2002 may be released accordingly.

Figure 21:
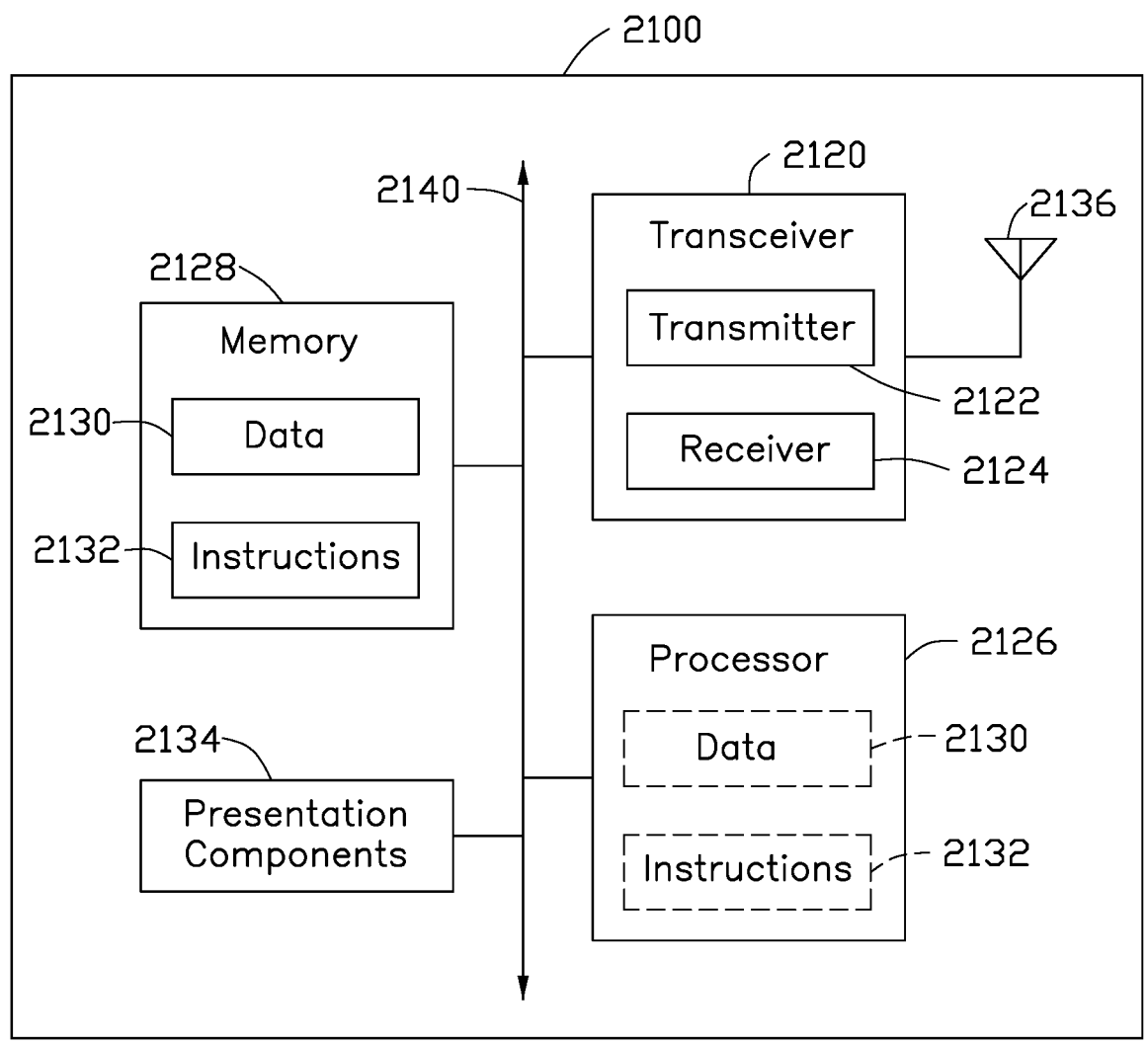
FIG. 21 illustrates a block diagram of a node for wireless communication, in accordance with various aspects of the present application.

FIG. 21 illustrates a block diagram of a node for wireless communication, in accordance with various aspects of the present application. As shown in FIG. 21, node 2100 may include transceiver 2120, processor 2126, memory 2128, one or more presentation components 2134, and at least one antenna 2136. Node 2100 may also include a Radio Frequency (RF) spectrum band module, a base station communications module, a network communications module, and a system communications management module, input/output (I/O) ports, I/O components, and power supply (not explicitly shown in FIG. 21). Each of these components may be in communication with each other, directly or indirectly, over one or more buses 2140.

Transceiver 2120 having transmitter 2122 and receiver 2124 may be configured to transmit and/or receive time and/or frequency resource partitioning information. In some implementations, transceiver 2120 may be configured to transmit in different types of subframes and slots including, but not limited to, usable, non-usable and flexibly usable subframes and slot formats. Transceiver 2120 may be configured to receive data and control channels.

Node 2100 may include a variety of computer-readable media. Computer-readable media can be any available media that can be accessed by node 2100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2128 may include computer-storage media in the form of volatile and/or non-volatile memory. Memory 2128 may be removable, non-removable, or a combination thereof. Exemplary memory includes solid-state memory, hard drives, optical-disc drives, and etc. As illustrated in FIG. 21, memory 2128 may store computer-readable, computer-executable instructions 2132 (e.g., software codes) that are configured to, when executed, cause processor 2126 to perform various functions described herein, for example, with reference to FIGS. 1 through 20. Alternatively, instructions 2132 may not be directly executable by processor 2126 but be configured to cause node 2100 (e.g., when compiled and executed) to perform various functions described herein.

Processor 2126 may include an intelligent hardware device, e.g., a central processing unit (CPU), a microcontroller, an ASIC, and etc. Processor 2126 may include memory. Processor 2126 may process data 2130 and instructions 2132 received from memory 2128, and information through transceiver 2120, the base band communications module, and/or the network communications module. Processor 2126 may also process information to be sent to transceiver 2120 for transmission through antenna 2136, to the network communications module for transmission to a core network.

One or more presentation components 2134 presents data indications to a person or other device. Exemplary one or more presentation components 2134 include a display device, speaker, printing component, vibrating component, and etc.

Some implementations of the present application reduce the size of measurement report content or the number of measurement reports in response to the stored CHO command(s). As such, signaling overhead during CHO procedures can be reduced.

Some implementations of the present application allow a source base station (e.g., gNB) to inform one or more target base stations (e.g., gNBs) about the types of the wanted CHO based on different UE characteristics such that the target base stations may make the appropriate CHO command to the UE. As such, radio resource waste due to unused CHO commands may be reduced.

Some implementations of the present application allow a source base station to instruct a UE to execute one of the preconfigured CHOs since the source base station may have a better view (e.g., the whole picture) of the system condition, which may save negotiation time with target base stations via X2/Xn interface.

As the CHO procedure may be regarded as a UE-initiated network-configured procedure, to keep the network controllability, some implementations of the present application may allow a UE to execute a CHO command only when a corresponding triggering condition of the CHO command is fulfilled. The triggering condition of a CHO command may be configured by the network in some of the present embodiments. Moreover, even though a CHO command(s) is transmitted to the UE, some implementations of the present application may allow the network to maintain controllability of the final handover procedure, for example, by having the ability to trigger the conventional handover procedure, which supersedes or overwrites the UE-selected CHO procedure.

To increase the network controllability, according to some implementations of the present application, a UE may send a notification to inform the source base station of the triggered CHO command which is associated with a response timer. A triggered CHO command may be one of which the triggering condition of a CHO command is fulfilled. In one implementation of the present application, a new timer is utilized such that the source base station may have a period of time to decide to give permission to the execution of the triggered CHO command, to transmit a new handover command, or to refuse the execution of the triggered CHO command. In one implementation of the present application, if the UE does not receive a response from the source base station before the timer is expired, the UE may determine that the serving cell quality has dropped rapidly such that no response could be received. In such a case, the UE may directly execute the triggered CHO command. In another implementation of the present application, a UE may send a notification to the source base station and directly perform the triggered CHO command without asking for permission, or waiting for a response, from the source base station.

According to some implementations of the present application, a selection mechanism among multiple triggered CHO commands is utilized to avoid unpredictable UE behaviors, where according to the selection mechanism, the handover procedures corresponding to the triggered CHO commands may be prioritized.

According to some implementations of the present application, a notification may be sent from a UE to a source base station to inform the base station of an execution of a CHO command to improve network performance.

According to some implementations of the present application, a mechanism for selecting a CHO failure response may be disclosed to reduce the unpredictability of the UE behaviors.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of a conditional handover (CHO) procedure for a user equipment (UE), the method comprising:
receiving, by the UE, a CHO command from a source base station, the CHO command having a CHO command identifier (ID), a first target cell configuration and at least one triggering condition;
in a case that the CHO command is received and the at least one triggering condition is fulfilled, performing a handover procedure according to the CHO command to connect to a first target cell indicated in the CHO command;
receiving, by the UE, after receiving the CHO command, a conventional handover command from the source base station, the conventional handover command having no triggering condition and indicating a second target cell; and
in a case that the CHO command is received and the at least one triggering condition is not fulfilled,
performing a handover procedure according to the conventional handover command to connect to the second target cell indicated in the conventional handover command, and
releasing the CHO command when the handover procedure according to the conventional handover command is successfully performed, wherein releasing the CHO command comprises releasing at least one of the first target cell configuration and one or more radio resources associated with the CHO command.

2. The method of claim 1, further comprising:
performing a radio resource control (RRC) connection re-establishment procedure upon an expiry of a CHO execution timer.

3. The method of claim 1, further comprising:
sending a CHO failure report to the source base station upon an expiry of a CHO execution timer.

4. The method of claim 1, wherein the CHO command comprises a CHO command priority.

5. The method of claim 1, wherein releasing the CHO command further comprises releasing the CHO ID associated with the CHO command.

6. The method of claim 1, wherein releasing the CHO command further comprises releasing the at least one triggering condition associated with the CHO command.

7. A user equipment (UE) comprising:
one or more non-transitory computer-readable media having computer-executable instructions embodied thereon;
at least one processor coupled to the one or more non-transitory computer-readable media, and configured to execute the computer-executable instructions to:
receive a conditional handover (CHO) command from a source base station, the CHO command having a CHO command identifier (ID), a first target cell configuration and at least one triggering condition;
in a case that the CHO command is received and the at least one triggering condition is fulfilled, perform a handover procedure according to the CHO command to connect to a first target cell indicated in the CHO command;
receive, after receiving the CHO command, a conventional handover command from the source base station, the conventional handover command having no triggering condition and indicating a second target cell;
in a case that the CHO command is received and the at least one triggering condition is not fulfilled,
perform a handover procedure according to the conventional handover command to connect to the second target cell indicated in the conventional handover command, and
release the CHO command when the handover procedure according to the conventional handover command is successfully performed, wherein releasing the CHO command comprises releasing at least one of the first target cell configuration and one or more radio resources associated with the CHO command.

8. The UE of claim 7, wherein the at least one processor is further configured to execute the computer-executable instructions to:
perform a radio resource control (RRC) connection re-establishment procedure upon an expiry of a CHO execution timer.

9. The UE of claim 7, wherein the at least one processor is further configured to execute the computer-executable instructions to:
send a CHO failure report to the source base station upon an expiry of a CHO execution timer.

10. The UE of claim 7, wherein the CHO command comprises a CHO command priority.

11. The UE of claim 7, wherein releasing the CHO command further comprises releasing the CHO ID associated with the CHO command.

12. The UE of claim 7, wherein releasing the CHO command further comprises releasing the at least one triggering condition associated with the CHO command.

* * * * *